United States Patent
Gerlach, Jr. et al.

[15] 3,658,543
[45] Apr. 25, 1972

[54] DUAL RESPONSE PHOTOSENSITIVE COMPOSITION CONTAINING ACYL ESTER OF TRIETHANOLAMINE

[72] Inventors: Howard G. Gerlach, Jr., West Chester, Pa.; Catharine E. Looney, Wilmington, Del.

[73] Assignee: E. I. du Pont de Nemours and Company, Wilmington, Del.

[22] Filed: Dec. 18, 1970

[21] Appl. No.: 99,512

[52] U.S. Cl. .................................................. 96/90
[51] Int. Cl. .................................................. G03c 1/52
[58] Field of Search ...................................... 96/90

[56] References Cited

UNITED STATES PATENTS

| | | | |
|---|---|---|---|
| 3,445,234 | 5/1969 | Cescon et al. | 96/90 |
| 3,390,994 | 7/1968 | Cescon | 96/90 |

Primary Examiner—Norman G. Torchin
Assistant Examiner—Won H. Louie, Jr.
Attorney—John R. Powell

[57] ABSTRACT

Improved photosensitive compositions comprising

A. an acid salt of a leuco aminotriarylmethane such as tris (4-N,N-diethylamino-o-tolyl)methane;

B. a hexaarylbiimidazole such as a 2,2'-bis(o-chloro-phenyl)-4,4',5,5'-tetraphenylbiimidazole; and C. a redox couple containing (1) as an oxidant a polynuclear quinone absorbing principally in the 400–550 nm region such as 1,6-pyrenequinone, and (2) as a reductant an acyl ester of triethanolamine such as triethanolamine triacetate optionally mixed with a lower alkyl ester of a nitrilotrialkanoic acid such as 3,3',3''-nitrilotripropionic acid, trimethyl ester are effective color forming compositions useful in a variety of applications.

20 Claims, No Drawings

3,658,543

DUAL RESPONSE PHOTOSENSITIVE COMPOSITION CONTAINING ACYL ESTER OF TRIETHANOLAMINE

BACKGROUND OF THE INVENTION

1. Field of the Invention

This invention relates to improved photosensitive compositions and more particularly is directed to an improved mixture of a photo-activatable color-forming system comprising a salt of a leuco aminotriarylmethane and a hexaarylbiimidazole and a photo-deactivating system comprising a mixture of a polynuclear quinone oxidant and a reductant containing an acyl ester of triethanolamine.

(2) Description of the Prior Art

U.S. Pat. No. 3,390,996 discloses light-activatable color-forming compositions, such as hexaarylbiimidazoles and leuco triarylmethane dyes, which form color on radiation with ultraviolet light, and can be deactivated against such color formation with light of a second wave length by incorporating therewith light-activatable oxidation-reduction systems, such as a visible light-activatable quinone in combination with a source of abstractable hydrogen such as an aliphatic polyether. Irradiation of such systems with ultraviolet light produces color corresponding to the dye form of the leuco triaryl methane dye component, while irradiation with visible light deactivates the color forming components against color formation. Deactivation is attributable to in situ formation of a hydroquinone of the quinone employed, which preferentially reduces photodissociated hexaarylbiimidazole before it can oxidize the leuco triarylmethane dye to color.

The above patent describes photoimaging and photofixing processes which involve sequentially exposing the photoimageable/photodeactivatable compositions to the two radiations, in two distinct steps, with the first applied imagewise, to produce a negative or a positive of the original image, depending on the order of the exposure.

The compositions of U.S. Pat. No. 3,390,994 are particularly outstanding in their photoimageable/photodeactivatable characteristics, providing fast-access positive prints. Moreover, the nitriloalkanoic acid esters of U.S. Pat. No. 3,390,994 provide a significant advantage over other reductants or hydrogen donors of U.S. Pat. No. 3,390,996, in that the esters markedly increase the reduction of the quinones to the corresponding hydroquinones and effect a much more rapid and complete deactivation.

Although highly satisfactory for the stated purposes, even the compositions of U.S. Pat. No. 3,390,994 are not perfect. Thus for example they tend to form precipitates on storage with resultant decrease in deactivation properties, and are sensitive to human handling.

It is an object of this invention to provide photosensitive compositions which form color rapidly, attain maximum color, can be readily deactivated for color formation, having good stability and reduced sensitivity to human handling or "fingerprinting." These and other objects are accomplished by the invention as described and illustrated.

SUMMARY OF THE INVENTION

In summary, the improved photosensitive compositions of this invention comprise an intimate admixture of a. an acid salt of an oxidizable, substituted, leuco aminotriarylmethane, and a strong acid;

b. a hexaarylbiimidazole which absorbs principally in the ultraviolet region and is a photooxidant for the leuco aminotriarylmethane;

c. a redox couple containing (1) as an oxidant a polynuclear quinone absorbing principally in the 400 Nm. to 550 Nm. region and (2) a reductant component; the improvement comprising using as the reductant from 0 to 90 percent of a lower alkyl ester of nitrilotriacetic or nitrilopropionic acid and from 10 to 100 percent of an acyl ester of triethanolamine of the formula $N(CH_2CH_2OCOR)_3$ wherein R is lower alkyl.

DESCRIPTION OF THE INVENTION

This invention is directed to improved photosensitive compositions which are activated toward color generation by radiation of wavelength $W_1$ and are rapidly and permanently deactivated toward color generation by radiation of wavelength $W_2$. The improved compositions comprise a color-forming system of (a) an acid salt of an oxidizable, substituted, leuco aminotriarylmethane, and (b) a hexaarylbiimidazole which absorbs principally in the ultraviolet region and is a photooxidant for the leuco aminotriarylmethane and a deactivating system of (1) a polynuclear quinone absorbing principally in the 400–550 Nm. region and (2) 0 to 90 percent of a lower alkyl ester of nitrilotriacetic or nitrilotripropionic acid and 10 to 100 percent of a short-chained acyl ester of triethanolamine.

1. The Color-Forming System

The color-forming system comprises a color generator and a photoactivatable oxidant. The color generator is an acid salt of a leuco aminotriarylmethane, which can be oxidized to its colored form by the photoactivatable oxidant. The term "leuco" is used herein to mean essentially colorless.

Representative of aminotriarylmethanes suitable for use in this invention are:

bis(4-amino-2-butylphenyl)(p-dimethylaminophenyl)methane
bis(4-amino-2-chlorophenyl)(p-aminophenyl)methane
bis(4-amino-3-chlorophenyl)(o-chlorophenyl)methane
bis(4-amino-3-chlorophenyl)phenylmethane
bis(4-amino-3,5-diethylphenyl)(o-chlorophenyl)methane
bis(4-amino-3,5-diethylphenyl)(o-ethoxyphenyl)methane
bis(4-amino-3,5-diethylphenyl)(p-methoxyphenyl)methane
bis(4-amino-3,5-diethylphenyl)phenylmethane
bis(4-amino3-ethylphenyl)(o-chlorophenyl)methane
bis(p-aminophenyl)(4-amino-m-tolyl)methane
bis(p-aminophenyl)(o-chlorophenyl)methane
bis(p-aminophenyl)(p-chlorophenyl)methane
bis(p-aminophenyl)(2,4-dichlorophenyl)methane
bis(p-aminophenyl)(2,5-dichlorophenyl)methane
bis(p-aminophenyl)(2,6-dichlorophenyl)methane
bis(p-aminophenyl)phenylmethane
bis(4-amino-o-tolyl)(p-chlorophenyl)methane
bis(4-amino-o-tolyl)(2,4-dichlorophenyl)methane
bis(p-anilinophenyl)(4-amino-m-tolyl)methane
bis(4-benzylamino-2-cyanophenyl)(p-aminophenyl)methane
bis(p-benzylethylaminophenyl)(p-chlorophenyl)methane
bis(p-benzylethylaminophenyl)(p-diethylaminophenyl)methane
bis(p-benzylethylaminophenyl)(p-dimethylaminophenyl)methane
bis(4-benzylethylamino-o-tolyl)(p-methoxyphenyl)methane
bis(p-benzylethylaminophenyl) phenylmethane
bis(4-benzylethylamino-o-tolyl)(o-chlorophenyl)methane
bis(4-benzylethylamino-o-tolyl)(p-diethylaminophenyl)methane
bis(4-benzylethylamino-o-tolyl)(4-diethylamino-o-tolyl)methane
bis(4-benzylethylamino-o-tolyl)(p-dimethylaminophenyl)methane
bis[2-chloro-4-(2-diethylaminoethyl)ethylaminophenyl](o-chloro-phenyl)methane
bis [p-bis(2-cyanoethyl)aminophenyl]phenylmethane
bis[p-(2-cyanoethyl)ethylamino-o-tolyl](p-dimethylaminophenyl)methane
bis[p-(2-cyanoethyl)methylaminophenyl](p-diethylaminophenyl)methane
bis(p-dibutylaminophenyl)[p-(2-cyanoethyl)methylaminophenyl]methane
bis(p-dibutylaminophenyl)(p-diethylaminophenyl)methane
bis(4-diethylamino-2-butoxyphenyl)(p-diethylamino-phenyl)methane
bis(4-diethylamino-2-fluorophenyl)o-tolylmethane
bis(p-diethylaminophenyl)(p-aminophenyl)methane
bis(p-diethylaminophenyl)(4-anilino-1-naphthyl)methane bis(p-diethylaminophenyl)(m-butoxyphenyl)methane
bis(p-diethylaminophenyl)(o-chlorophenyl)methane
bis(p-diethylaminophenyl)(p-cyanophenyl)methane
bis(p-diethylaminophenyl)(2,4-dichlorophenyl)methane
bis(p-diethylaminophenyl)(4-diethylamino-1-naphthyl)methane
bis(p-diethylaminophenyl)(p-dimethylaminophenyl)methane
bis(p-diethylaminophenyl)(4-ethylamino-1-naphthyl)methane
bis(p-diethylaminophenyl)2-naphthylmethane
bis(p-diethylaminophenyl)(p-nitrophenyl)methane
bis(p-diethylaminophenyl)2-pyridylmethane
bis(p-diethylamino-m-tolyl)(p-diethylaminophenyl)methane
bis(4-diethylamino-o-tolyl)(o-chlorophenyl)methane
bis(4-diethylamino-o-tolyl)(p-diethylaminophenyl)methane
bis(4-diethylamino-o-tolyl)(p-diphenylaminophenyl)methane
bis(4-diethylamino-o-tolyl)phenylmethane
bis(4-dimethylamino-2-bromophenyl)phenylmethane
bis(p-dimethylaminophenyl)(4-anilino-1-naphthyl)methane
bis(p-dimethylaminophenyl)(p-butylaminophenyl)methane
bis(p-dimethylaminophenyl)(p-sec. butylethylamino-phenyl)methane
bis(p-dimethylaminophenyl)(p-chlorophenyl)methane
bis(p-dimethylaminophenyl)(p-diethylaminophenyl)methane
bis(p-dimethylaminophenyl)(4-dimethylamino-1-naphthyl)methane
bis(p-dimethylaminophenyl)(6-dimethylamino-m-tolyl)methane
bis(p-dimethylaminophenyl)(4-dimethylamino-o-tolyl)methane
bis(p-dimethylaminophenyl)(4-ethylamino-1-naphthyl)methane
bis(p-dimethylaminophenyl)(p-methoxyphenyl)methane
bis(p-dimethylaminophenyl)(p-methoxyphenyl)methane
bis(p-dimethylaminophenyl)(5-methyl-2-pyridyl)methane
bis(p-dimethylaminophenyl)2-quinolylmethane
bis(p-dimethylaminophenyl)o-tolylmethane
bis(p-dimethylaminophenyl)(1,3,3-trimethyl-2-indolinylidene-methyl)methane
bis(4-dimethylamino-o-tolyl)(p-aminophenyl)methane
bis(4-dimethylamino-o-tolyl)(o-bromophenyl)methane
bis(4-dimethylamino-o-tolyl)(o-cyanophenyl)methane
bis(4-dimethylamino-o-tolyl)(o-fluorophenyl)methane
bis(4-dimethylamino-o-tolyl)1-naphthylmethane
bis(4-dimethylamino-o-tolyl)phenylmethane
bis(p-ethylaminophenyl)(o-chlorophenyl)methane
bis(4-ethylamino-m-tolyl)(o-methoxyphenyl)methane
bis(4-ethylamino-m-tolyl)(p-methoxyphenyl)methane
bis(4-ethylamino-m-tolyl)(p-dimethylaminophenyl)methane
bis(4-ethylamino-m-tolyl)(p-hydroxyphenyl)methane
bis[4-ethyl(2-hydroxyethyl)amino-m-tolyl](p-diethylaminophenyl)methane
bis[p-(2-hydroxyethyl)aminophenyl](o-chlorophenyl)methane
bis[p-(bis(2-hydroxyethyl)aminophenyl](4-diethylamino-o-tolyl)methane
bis[p-(2-methoxyethyl)aminophenyl]phenylmethane
bis(p-methylaminophenyl)(o-hydroxyphenyl)methane
bis(p-propylaminophenyl)(m-bromophenyl)methane
tris(4-amino-o-tolyl)methane
tris(4-anilino-o-tolyl)methane
tris(p-benzylaminophenyl)methane
tris[4-bis(2-cyanoethyl)amino-o-tolyl]methane
tris[p-(2-cyanoethyl)ethylaminophenyl]methane
tris(p-dibutylaminophenyl)methane
tris(p-di-n-butylaminophenyl)methane
tris(4-diethylamino-2-chlorophenyl)methane
tris(p-diethylaminophenyl)methane
tris(4-diethylamino-o-tolyl)methane
tris(p-dihexylamino-o-tolyl)methane
tris(4-dimethylamino-o-tolyl)methane
tris(p-hexylaminophenyl)methane
tris[p-bis(2-hydroxyethyl)aminophenyl]methane
tris(p-methylaminophenyl)methane
tris(p-dioctadecylaminophenyl)methane
tris(4-diethylamino-2-fluorophenyl)methane
tris(4-dimethylamino-2-fluorophenyl)methane
bis(2-bromo-4-diethylaminophenyl)phenylmethane
bis(2-butoxy-4-diethylaminophenyl)phenylmethane
bis(4-diethylamino-o-tolyl)(p-methoxyphenyl)methane
bis(4-diethylamino-2-methoxyphenyl)(p-nitrophenyl)methane
bis(4-diethylamino-1-naphthyl)(4-diethylamino-o-tolyl)methane
bis(4-diethylamino-o-tolyl)1-naphthylmethane
tris(4-dimethylamino-2-chlorophenyl)methane
bis(4-dimethylamino-2,5-dimethylphenyl)phenylmethane
bis(4-dimethylamino-o-tolyl)(o-bromophenyl)methane
bis(4-ethylbenzylamino-o-tolyl)(p-methoxyphenyl)methane
tris(p-dioctylamino-o-tolyl)methane
bis(4-diethylamino-o-tolyl)(4-methoxy-1-naphthyl)methane
bis(4-diethylamino-o-tolyl)(3,4,5-trimethoxyphenyl)methane
bis(4-diethylamino-o-tolyl)(p-hydroxyphenyl)methane
5-[bis(4-diethylamino-o-tolyl)-methyl]-2,3-cresotic acid
4-[bis(4-diethylamino-o-tolyl)-methyl]-phenol
4-[bis(4-diethylamino-o-tolyl)-methyl]-acetanilide
4-[bis(4-diethylamino-o-tolyl)-methyl]-phenylacetate
4-[bis(4-diethylamino-o-tolyl)-methyl]-benzoic acid
4-[bis(4-diethylamino-o-tolyl)-methyl]-diphenyl sulfone
4-[bis(4-diethylamino-o-tolyl)-methyl]-phenylmethyl sulfone
4-[bis(4-diethylamino-o-tolyl)-methyl]-methylsulfonanilide
4-[bis(4-diethylamino-o-tolyl)-methyl]-p-tolylsulfonanilide
bis(4-diethylamino-o-tolyl)(p-nitrophenyl)methane
bis(4-diethylamino-o-tolyl)(2-diethylamino-4-methyl-5-thiazolyl)methane
bis(4-diethylamino-o-tolyl)(2-diethylamino-5-methyl-6-benzoxazolyl)methane
bis(4-diethylamino-o-tolyl)(2-diethylamino-5-methyl-6-benzothiazolyl)methane
bis(4-diethylamino-o-tolyl)(1-ethyl-2-methyl-3-indolyl)-methane
bis(4-diethylamino-o-tolyl)(1-benzyl-2-methyl-3-indolyl)methane
bis(4-diethylamino-o-tolyl)(1-ethyl-2-methyl-5-methoxyl-3-indolyl)methane
bis(1-o-xylyl-2-methyl-3-indolyl)(4-diethylamino-o-tolyl)methane
bis(4-diethylamino-o-tolyl)(1-ethyl-5-indolinyl)methane
bis(1-isobutyl-6-methyl-5-indolinyl)(4-diethylamino-o-tolyl)-methane
bis(4-diethylamino-o-tolyl)(8-methyl-9-julolindinyl)methane
bis(4-diethylamino-2-acetamidophenyl)(4-diethylamino-o-tolyl)-methane
4-[bis(4-diethylamino-o-tolyl)methyl]-N-ethylacetanilide
bis[4-(1-phenyl-2,3-dimethyl-5-pyrazolinyl)](4-diethylamino-o-tolyl)methane
bis(4-diethylamino-o-tolyl)(7-diethylamino-4-methyl-3-coumarinyl)methane
bis(4-diethylamino-o-tolyl)(4-acrylamidophenyl)methane
bis(4-diethylamino-o-tolyl)(p-benzylthiophenyl)methane
bis(4-diethylamino-o-tolyl)(4-isopropylthio-3-methylphenyl)-methane
bis(4-diethylamino-o-tolyl)(4-chlorobenzylthiophenyl)methane
bis(4-diethylamino-o-tolyl)(2-furyl)methane
bis(4-diethylamino-o-tolyl)(3,4-methylenedioxyphenyl)methane
bis(4-diethylamino-o-tolyl)(3,4-dimethoxyphenyl)methane
bis(4-diethylamino-o-tolyl)(3-methyl-2-thienyl)methane
bis(4-diethylamino-o-tolyl)(2,4-dimethoxyphenyl)methane
bis[4-(2-cyanoethyl)(2-hydroxyethyl)amino-o-tolyl]-(p-benzylthiophenyl)methane
bis[4-(2-cyanoethyl)(2-hydroxyethyl)amino-o-tolyl]-2-thienylmethane
bis(4-dibutylamino-o-tolyl)2-thienylmethane
bis(4-diethylamino-2-ethylphenyl)(3,4-methylene-dioxyphenyl)methane
bis(4-diethylamino-2-fluorophenyl)(p-benzylthio-phenyl)methane bis(4-diethylamino-2-fluorophenyl)(3,4-methylene-dioxyphenyl)methane
bis(4-diethylamino-o-tolyl)(p-methylthiophenyl)methane
bis(4-diethylamino-o-tolyl)2-thienylmethane
bis(4-dimethylamino-2-hexylphenyl)(p-butylthiophenyl)methane
bis[4-(N-ethylanilino)-o-tolyl](3,4-dibutoxyphenyl)methane
bis[4-bis(2-hydroxyethyl)amino-2-fluorophenyl](p-benzylthio-phenyl)methane
bis(4-diethylamino-o-tolyl)(p-chlorophenyl)methane
bis(4-diethylamino-o-tolyl)(p-bromophenyl)methane
bis(4-diethylamino-o-tolyl)(p-fluorophenyl)methane
bis(4-diethylamino-o-tolyl)(p-tolylmethane)
bis(4-diethylamino-o-tolyl) 3-methylthienyl methane Other aminotriarylmethanes suitable for use in this invention are:
bis(p-diethylamino-o-tolyl)(p-n-hexanamidophenyl)methane
bis(p-diethylamino-o-tolyl)(p-n-octanamidophenyl)methane
bis(p-diethylamino-o-tolyl)(p-n-dodecanamidophenyl)methane
bis(p-diethylamino-o-tolyl)(p-n-hexadecanamidophenyl)methane
bis(p-diethylamino-o-tolyl)(p-cyclohexanamidophenyl)methane
bis(p-diethylamino-o-tolyl)(p-1-adamantylcarboxamidophenyl)-methane
bis(p-diethylamino-o-tolyl)(p-benzamidophenyl)methane
bis(p-diethylamino-o-tolyl)(p-phenylacetamidophenyl)methane
bis(p-diethylamino-o-tolyl)(p-α-methoxyacetamidophenyl)methane
bis(p-diethylamino-o-tolyl)(p-α-carbethoxyacetamidophenyl)methane
bis(p-diethylamino-o-tolyl)(p-n-octylsulfonamidophenyl)methane
bis(p-diethylamino-o-tolyl)(pα-methoxyacetamido-m-methoxy-phenyl)methane
bis(p-diethylamino-o-tolyl)(p-n-octanamido-m-methoxyphenyl)-methane
bis(p-diethylamino-o-tolyl)(p-n-octylsulfonamido-m-methoxy-phenyl)methane
bis(p-diethylamino-o-tolyl)(p-acetamido-m-methoxyphenyl)methane
bis(p-diethylamino-o-tolyl)(3,5-dimethyl-4-n-octanamidophenyl)methane
bis(p-diethylamino-o-tolyl)(3,5-dimethoxyphenyl)methane
The diamide of bis(p-diethylamino-o-tolyl)(p-aminophenyl)-methane and oxalic acid.
The diamide of bis(p-diethylamino-o-tolyl)(p-aminophenyl)-methane and malonic acid.
The diamide of bis(p-diethylamino-o-tolyl)(p-aminophenyl)-methane and glutaric acid.
The diamide of bis(p-diethylamino-o-tolyl)(p-aminophenyl)-methane and adipic acid.

Preferably the aminotriarylmethane is one wherein at least two of the aryl groups are phenyl groups having (a) an $R_1R_2N$-substituent in the position para to the bond to the methane carbon atom wherein $R_1$ and $R_2$ are each groups selected from hydrogen, $C_1$ to $C_{10}$ alkyl, 2-hydroxyethyl, 2-cyanoethyl, benzyl or phenyl, and (b) a group ortho to the bond to the methane carbon atom which is selected from lower alkyl, lower alkoxy, fluorine, chlorine, bromine, or butadienylene which when joined to the phenyl group forms a naphthalene ring; and the third aryl group, when different from the first two, is selected from thienyl, furyl, oxazylyl, pyridyl, thiazolyl, indolyl, indolinyl, benzooxazolyl, quinolyl, benzothiazolyl, phenyl, naphthyl, or such afore-listed groups substituted with lower alkyl, lower alkoxy, methylenedioxy, fluoro, chloro, bromo, amino, lower alkylamino, lower dialkylamino, lower alkylthio, hydroxy, carboxy, carbonamido, lower carbalkoxy, lower alkylsufonyl, lower alkylsulfonamido, $C_6$ to $C_{10}$ arylsulfonamido, nitro or benzylthio. The third aryl group can of course be the same as the first two.

Particularly preferred aminotriarylmethanes have the following structural formula:

(I)
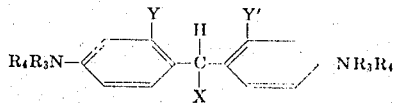

wherein $R_3$ and $R_4$ are selected from benzyl or lower alkyl (preferably ethyl), Y and Y' are lower alkyl (preferably methyl) and X is selected from

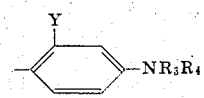

, p-methoxyphenyl, 2-thienyl, phenyl, 1-naphthyl, 3,4-dimethoxyphenyl, 3,4-methylene-dioxyphenyl, or p-benzylthiophenyl, Preferably X is selected from

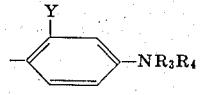

, phenyl, 3,4-dimethoxyphenyl, or p-benzylthiophenyl.

These triarylmethanes are employed as salts of strong acids: for example, mineral acids such as hydrochloric, hydrobromic, sulfuric, nitric, phosphoric; organic acids such as acetic, oxalic, p-toluenesulfonic, trichloroacetic acid, trifluoroacetic acid, perfluoroheptanoic acid; and Lewis acids such as zinc chloride, zinc bromide, and ferric chloride; the proportion of acid usually varying from 0.33 mole to 1 mole per amino group. The term "strong acid" as used herein is defined as an acid which forms a salt with an anilino amino group.

Dodecylbenzenesulfonic acid is particularly preferred as the acid component leading to dual response photosensitive compositions having improved storability.

Blends, i.e., mixtures, of the above aminotriarylmethanes are also suitable for use in this invention. For example, a 3:1 molar blend of bis(4-diethylamino-o-tolyl) (3,4-dimethoxyphenyl) methane with tris(4-diethylamino-o-tolyl)methane can be used to obtain a dual response photosensitive composition yielding a purple color possessing a higher visual contrast than is achieved by either component alone in the same composition. This blend is particularly useful for optical headlining, general photoproofing and other markets where ortho film capture or the more neutral higher visual contrast is preferred. A specific advantage for use of this blend in the photosensitive compositions of this invention is the excellent copyability obtainable using commercial "Xerox" and other common office copiers.

Another particularly useful blend of aminotriarylmethanes is composed of a 4:5 molar blend of bis(4-diethylamino-o-tolyl) (3,4-dimethoxyphenyl)methane and bis(4-diethylamino-o-tolyl)phenylmethane. This blend produces near-black images when incorporated into the compositions of this invention.

The hexaarylbiimidazoles suitable as photoactivatable oxidants for the aminotriarylmethanes are the 2,2',4,4',5,5'-hexaarylbiimidazoles, sometimes called 2,4,5-triarylimidazolyl dimers, that are photodissociable to the corresponding triarylimidazolyl radicals. These hexaarylbiimidazoles absorb maximally in the region of 255 Nm. to 275 Nm. wavelength and usually show some lesser absorption in the region of 300 Nm. to 375 Nm. wavelength. The absorption bands tend to tail out to include wavelengths as high as 420 Nm. but they normally require light rich in 255 Nm. to 375 Nm. wavelength for dissociation. Thus the radiation of $W_1$ is 200 Nm. to 420 Nm.

The hexaarylbiimidazoles can be represented by the formula (2) 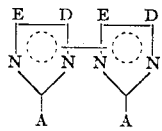

wherein A, E and D represent aryl groups which can be the same or different, carbocyclic or heterocyclic, unsubstituted or bearing substituents that do not interfere with the dissociation of the hexaarylbiimidazole or with the oxidation of the leuco aminotriarylmethane. Each dotted circle in the formula stands for four delocalized electrons (i.e., two conjugated double bonds) which satisfy the valences of the carbon and nitrogen atoms of the imidazolyl ring. The E and D aryl groups can each be substituted with 0-3 substituents and the A aryl groups can be substituted with 0-4 substituents.

The aryl groups include one- and two-ring aryls, such as phenyl, biphenyl, naphthyl, pyridyl, furyl and thienyl. Suitable inert substituents on the aryl groups have Hammett sigma (para) values in the −.5 to 0.8 range, and are other than hydroxyl, sulfhydryl, amino, alkylamino or dialkylamino groups. Representative substituents and their sigma values, (relative to H = .00), as given by Jaffe, Chem. Rev. 53, 219–233(1953) are: methyl (−0.17), ethyl (−0.15), t-butyl (−0.20), phenyl (0.01), butoxy (−0.32), phenoxy (−0.03), fluoro (0.06), chloro (0.23), bromo (0.23), iodo (0.28), methylthio (−0.05), nitro (0.78), ethoxycarbonyl (0.52), and cyano (0.63). The foregoing substituents are preferred; however, other substituents which may be employed include trifluoromethyl (0.55), chloromethyl (0.18), carboxyl (0.27), cyanomethyl (0.01), 2-carboxyethyl (−0.07), and methylsulfonyl (0.73). Thus, the substituents can be halogen, cyano, lower hydrocarbyl (including alkyl, halo alkyl, cyanoalkyl, hydroxyalkyl and aryl), lower alkoxy, aryloxy, lower alkylthio, arylthio, sulfo, alkyl sulfonyl, arylsulfonyl, nitro, and lower alkylcarbonyl. In the foregoing list, alkyl groups referred to are preferably of 1–6 carbon atoms; while aryl groups referred to are preferably of 6–10 carbon atoms.

Preferably the aryl radicals are carbocyclic, particularly phenyl, and the substituents have Hammett sigma values in the range −.4 to +.4, particularly lower alkyl, lower alkoxy, chloro, fluoro, bromo and benzo groups.

In a preferred hexaarylbiimidazole class, the 2 and 2' aryl groups are phenyl rings bearing an ortho substituent having a Hammett sigma value in the range −.4 to +.4. Preferred ortho substituents are fluorine, chlorine, bromine, methyl and methoxy groups, especially chloro. Such biimidazoles tend less than others to form color when the light-sensitive compositions are applied to and dried on substrates at somewhat elevated temperatures, e.g., in the range 70°–100° C.

Most preferably, the 2-phenyl ring carries only the above-described ortho group, and the 4- and 5-phenyl rings are either unsubstituted or substituted with lower alkoxy.

Preferred hexaarylbiimidazoles include 2,2'-bis(o-chlorophenyl)-4,4',5,5'-tetraphenylbiimidazole and 2,2'-bis(o-chlorophenyl)-4,4',5,5'-tetrakis(m-methoxyphenyl)biimidazole.

Representative of hexaarylbiimidazoles suitable for use in this invention are:
2,2'-bis(o-bromophenyl)-4,4',5,5'-tetraphenylbiimidazole
2,2'-bis(p-bromophenyl)-4,4',5,5'-tetraphenylbiimidazole
2,2'-bis(o-chlorophenyl-4,4',5,5'-tetrakis(p-methoxyphenyl)biimidazole
2,2'-bis(o-chlorophenyl)-4,4',5,5'-tetraphenylbiimidazole
2,2'-bis(p-chlorophenyl)-4,4',5,5'-tetrakis(p-methoxyphenyl)-biimidazole
2,2'-bis(p-cyanophenyl)-4,4',5,5'-tetrakis(p-methoxyphenyl)-biimidazole
2,2'-bis(2,4-dichlorophenyl)-4,4',5,5'-tetraphenylbiimidazole
2,2'-bis(2,4-dimethoxyphenyl)-4,4',5,5'-tetraphenylbiimidazole
2,2'-bis(o-ethoxyphenyl)-4,4',5,5'-tetraphenylbiimidazole
2,2'-bis(m-fluorophenyl)-4,4',5,5'-tetraphenylbiimidazole
2,2'-bis(o-fluorophenyl)-4,4',5,5'-tetraphenylbiimidazole
2,2'-bis(p-fluorophenyl)-4,4',5,5'-tetraphenylbiimidazole
2,2'-bis(o-n-hexyloxyphenyl)-4,4',5,5'-tetraphenylbiimidazole
2,2'-bis(o-n-hexylphenyl)-4,4',5,5'-tetrakis(p-methoxyphenyl)-biimidazole
2,2'-bis(3,4-methylenedioxyphenyl)-4,4',5,5'-tetraphenylbiimidazole
2,2'-bis(o-chlorophenyl)-4,4',5,5'-tetrakis(m-methoxyphenyl)-biimidazole
2,2'-bis(o-chlorophenyl)-4,4',5,5'-tetrakis[m-(β-phenoxyethoxyphenyl)biimidazole
2,2'-bis(2,6-dichlorophenyl)-4,4',5,5'-tetraphenylbiimidazole
2,2'-bis(o-methoxyphenyl)-4,4',5,5'-tetraphenylbiimidazole
2,2'-bis(p-methoxyphenyl)-4,4'-bis(o-methoxyphenyl)-5,5'-diphenylbiimidazole
2,2'-bis(o-nitrophenyl)-4,4',5,5'-tetraphenylbiimidazole
2,2'-bis(p-phenylsulfonylphenyl)-4,4',5,5'-tetraphenylbiimidazole
2,2'-bis(p-sulfamoylphenyl)-4,4',5,5'-tetraphenylbiimidazole
2,2'-bis(2,4,6-trimethylphenyl)-4,4',5,5'-tetraphenylbiimidazole
2,2'-di-4-biphenylyl-4,4',5,5'-tetraphenylbiimidazole
2,2'-di-1-naphthyl-4,4',5,5'-tetrakis(p-methoxyphenyl)-biimidazole
2,2'-di-9-phenanthryl-4,4',5,5'-tetrakis(p-methoxyphenyl)-biimidazole
2,2'-diphenyl-4,4',5,5'-tetra-4-biphenylylbiimidazole
2,2'-diphenyl-4,4',5,5'-tetra-2,4-xylylbiimidazole
2,2'-di-3-pyridyl-4,4',5,5'-tetraphenylbiimidazole
2,2'-di-3-thienyl-4,4',5,5'-tetraphenylbiimidazole
2,2'-di-o-tolyl-4,4',5,5'-tetraphenylbiimidazole
2,2'-di-p-tolyl-4,4'-di-o-tolyl-5,5'-diphenylbiimidazole
2,2'-di-2,4-xylyl-4,4',5,5'-tetraphenylbiimidazole
2,2',4,4',5,5'-hexakis(p-benzylthiophenyl)biimidazole
2,2',4,4',5,5'-hexa-1-naphthylbiimidazole
2,2',4,4',5,5'-hexaphenylbiimidazole
2,2'-bis(2-nitro-5-methoxyphenyl)-4,4',5,5'-tetraphenylbiimidazole
2,2'-bis(o-nitrophenyl)-4,4',5,5'-tetrakis(m-methoxyphenyl-biimidazole
2,2'-bis(2-chloro-5-sulfophenyl)-4,4',5,5'-tetraphenylbiimidazole
2,2'-bis(o-chlorophenyl)-4,4'-bis(p-methoxyphenyl)-5,5'-diphenylbiimidazole
2,2'-bis(o-chloro-p-methoxyphenyl)-4,4',5,5'-tetraphenylbiimidazole
2,2'-bis(o-chlorophenyl)-4,4',5,5'-tetrakis(m,p-dimethoxyphenyl)biimidazole
2,2'-bis(o-chlorophenyl)-4,4',5,5'-tetrakis(m-nitrophenyl)biimidazole; and their mixtures.

The above dimers of 2,4,5-triarylimidazolyl radicals which provide light-activated oxidants for the aminotriarylmethanes are characterized by the property of dissociating into two triarylimidazolyl free radicals when illuminated with ultraviolet light of wavelength from about 200 nm. to 420 Nm. Such a dissociation may be detected, and the existence of the free radicals discerned, by electron paramagnetic resonance, by ultraviolet spectra, and by visible spectra.

The hexaarylbiimidazoles of formula (1) are conveniently obtained by methods known to the art. The preferred method, involving oxidative dimerization of the corresponding triarylimidazole with ferricyanide in alkali, generally yields the 1,2'-hexaarylbiimidazoles, although other isomers, such as the 1,1',1,4'',2,4' and 4,4' -hexaarylbiimidazoles are sometimes also obtained admixed with the 1,2' isomer. For the purposes of this invention, it is immaterial which isomer is employed so long as it is photo-dissociable to the triarylimidazolyl radical, as discussed above.

The molar ratio of hexaarylbiimidazole to aminotriarylmethane in the compositions of this invention will ordinarily range from about 0.1:1 to about 10:1 and preferably from about 1:1 to about 3:1.

2. THE DEACTIVATING SYSTEM

The deactivating component of the photosensitive compositions of this invention comprises a second photoactivatable oxidant and a reductant. The deactivating component is sometimes referred to as a "redox couple." The second photoactivatable oxidant is a polynuclear quinone absorbing principally in the 400–550 Nm. region such as 1,6-pyrenequinone, 1,8-pyrenequinone, 9,10-phenanthrenequinone and mixtures thereof. The preferred oxidant is 9,10-phenanthrenequinone. Thus the radiation at the deactivating light ($W_2$) ranges from 400–550 Nm.

The reductant component of the deactivating system comprises 0 to 90 percent of a $C_1$ to $C_4$ alkyl ester of nitrilotriacetic acid or of 3,3',3''-nitrilotripropionic acid, preferably trimethyl nitrilopropionate; and from 10 to 100 percent of an ester of the formula (3)    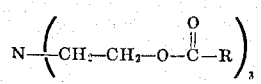

wherein R is lower alkyl.

Representative of suitable esters of the above formula are triethanolamine triacetate, triethanolamine tripropionate, triethanolamine tributyrate, and triethanolamine trivalerate. The preferred esters are triethanolamine triacetate and triethanolamine tripropionate. These esters are readily prepared by esterification of a suitable carboxylic acid, or its derivative such as the acid chloride or anhydride, with triethanolamine, or by transesterification. See J.Am.Chem.Soc., 47 2,966 (1925) or J.Chem.Soc., Japan, Ind.Chem. Sect. 57, 402 (1954).

Surprisingly, use of 10 to 100 percent and preferably 25 to 60 percent of the esters of formula (3) produces distinctly beneficial results in the photosensitive compositions of this invention. More particularly, the presence in the photosensitive compositions of a compound of formula (3) imparts improved imaging and color formation as well as markedly improved storage stability.

The amount of quinone component used in the redox couple is based on the biimidazole used and molar ratios of from 0.01:1 to 2:1 can be employed with ratios of 0.2:1 to 0.6:1 being preferred. The amount of reductant component used in the redox couple is based on the quinone component and molar ratios of from about 1:1 to about 90:1 can be employed with ratios of from 10:1 to 20:1 being preferred.

3. OTHER COMPONENTS

Polymeric binders can also be present in the light-sensitive compositions to thicken them or adhere them to substrates. The binders can also serve as a matrix for the color-forming composition and the mixture can be cast, extruded or otherwise formed into unsupported imageable films. Light-transparent and film-forming polymers are preferred. Examples are ethyl cellulose, polyvinyl alcohol, polyvinyl chloride, polystyrene, polyvinyl acetate, poly-(methyl, propyl or butyl methacrylate), cellulose acetate, cellulose butyrate, cellulose acetate butyrate, cellulose nitrate, chlorinated rubber, copolymers of the above vinyl monomers, and gelatin. Binder or matrix amounts vary from about 0.5 part to about 200 parts by weight per part of combined weight of the leuco aminotriarylmethane and hexaarylbiimidazole. In general, from 0.5 to 10 parts are used as adhesive or thickener, while higher amounts are used to form the unsupported films.

The binder composition can also contain inert infusible fillers such as sand, titanium dioxide, organophilic colloidal silica, bentonite, powdered glass, micron-sized alumina and mica in minor, non-interfering amounts. Indeed, formulations containing micron-sized silicas, as, for example, the "Syloid" silica gels, sold by W. R. Grace & Co., are particularly useful for providing a "tooth" for pencil or ink receptivity and eliminating blocking tendencies.

Conversely, for some applications the photosensitive compositions of this invention may contain no binder. Binderless and binder-containing compositions, as described herein, are useful for "lofting," the coating of certain metals and enameled surfaces with a photosensitive solution to yield a photosensitive plate with good abrasion resistance and high optical density after processing. For example, metal substrates such as "Preparakote" coated steel or aluminum, anodized aluminum and zinc are coated with photosensitive solutions of this invention which absorb or are imbibed into or onto the surface of the metal. These systems yield a product with high contrast and very good abrasion resistance when irradiated with ultraviolet ($W_1$) and visible light ($W_2$) as described herein.

The photosensitive compositions of this invention are of considerable interest for lofting, due to the simplicity of imaging and fixing (i.e., deactivation), and since they possess sufficient anchorage or imbibition to enable cutting or filing of the finished plates.

With some polymers, it is desirable to add a plasticizer to give flexibility to the film or coating. Plasticizers include the polyethylene glycols such as the commercially available carbowaxes, and related materials, such as substituted phenolethylene oxide adducts, for example the polyethers obtained from o-, m- and p-cresol, o-, m- and p-phenylphenol and p-nonylphenol, including commercially available materials such as the "Igepal" alkyl phenoxy polyoxyethylene ethanols. Other plasticizers are the acetates, propionates, butyrates and other carboxylate esters of ethylene glycol, diethylene glycol, glycerol, pentaerythritol and other polyhydric alcohols, and alkyl phthalates and phosphates such as dimethyl phthalate, diethyl phthalate, dioctyl phthalate, tributyl phosphate, trihexyl phosphate, trioctyl phosphate, triphenyl phosphate, tricresyl phosphate and cresyl diphenyl phosphate. These plasticizers can be used in concentrations ranging from 1:20 to 5:3 and preferably 1:5 to 1:2, based on the weight of the binder used.

Particularly useful plasticizers, frequently employed in conjunction with the above polymers, are alkyl arenesulfonamides of the structure (4)    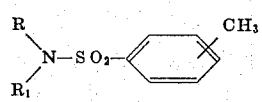

wherein R and $R_1$ are the same or different and are hydrogen, alkyl of 1 to 4 carbon atoms or 2-hydroxyethyl. N-ethyl-p-toluenesulfonamide, below, is a preferred plasticizer

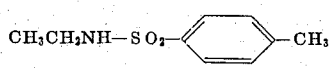

and other useful compounds include

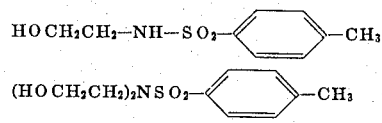

as well as mixtures of ortho and para-N-ethyl toluenesulfonamides.

When these arenesulfonamides are added to the photo-sensitive compositions of this invention, their concentration range, based by weight on the binder present, is also from 1:20 to 5:3, and preferably is from 1:5 to 1:3.

Formulations containing a preferred plasticizer show improved deactivation characteristics such as speed and background stability; and improved physical properties including adhesion, resistance to fingerprinting, and shelf stability. In particular, tendencies toward phase separation and crystallization in the coating on storage are markedly reduced.

In general solvents are employed which are volatile at ordinary pressures. Examples are amides such as N,N-dimethylformamide and N,N-dimethylacetamide; alcohols and ether alcohols such as methanol, ethanol, 1-propanol, 2-propanol, butanol, and ethylene glycol; esters such as methyl acetate and ethyl acetate; aromatics such as benzene, o-dichlorobenzene and toluene; ketones such as acetone, methyl ethyl ketone and 3-pentanone; aliphatic halocarbons such as methylene chloride, chloroform, 1,1,2-trichloroethane, 1,1,2,2-tetrachloroethane and 1,1,2-trichloroethylene; miscellaneous solvents such as dimethylsulfoxide, pyridine, tetrahydrofuran, dioxane, dicyanocyclobutane and 1-methyl-2-oxo-hexamethyleneimine; and mixtures of these solvents in various proportions as may be required to attain solutions. It is often beneficial to leave a small residue of solvent in the dried composition so that the desired degree of imaging can be obtained upon subsequent irradiation. Ordinary drying such as that employed in paper manufacture or in film casting results in the retention of ample solvent to give a composition with good photosensitivity. The compositions so produced are dry to the touch and stable to storage at room temperature. Indeed, moisture of the air is absorbed by many of the compositions, particularly those comprising an acid salt of an aminotriarylmethane on cellulosic substrates, and serves as a suitable solvent.

As stated above, solvent mixtures are also beneficial since multicomponent solvent systems allow for customized drying parameters. A solvent system for cellulose acetate butyrate polymers useful as a coating solvent consists of:

| | |
|---|---|
| butyl acetate | 20% |
| ethyl acetate | 10% |
| isopropanol | 20% |
| n-butanol | 10% |
| toluene | 40% |

This particular system gives improved flow-out and drying parameters and allows streak free coatings to be made, especially on film.

Other useful multicomponent solvent systems include ternary mixtures consisting of 80–90 percent of a methanol/2-propanol mixture (10/1 ratio) and 10–20 percent acetone; or 42.5 percent acetone, 18.5 percent ethyl acetate and 39 percent toluene; and a 6-component system containing 15 percent acetone, 17.7 percent ethyl acetate, 15.2 percent ethanol, 4.9 percent butanol, 23 percent toluene, and 24.3 percent hexane.

As described herein, coating with the photosensitive formulations is frequently done from an acetone solution. While the coatings are generally made in the same manner, there is little control on the acetone content of the coated papers. The amount of acetone left in the coated paper may be very important in determining the storage behavior of the material.

Aged samples of dual response formulations have been found to turn blue when exposed to window light. Normally this blue color is of much higher optical density at the edges of the paper, as if the coating had "dried out." This effect can be reproduced by storing a sample of paper in a vacuum oven overnight. An interesting observation is that the aged material can be restored by treatment in a chamber saturated with acetone. One year old material was treated in an acetone vapor chamber for three minutes with the result that nearly all window light stability, which the sample had lost on storage, was restored. 4. Preparation of the composition It has been discovered that the quinone photodeactivator component and the polyether plasticizer component, when present, tend to undergo a dark reaction in alkaline or neutral media. This dark reaction tends to lower the effective concentration of the photodeactivator. A specific example of this dark reaction, under neutral or alkaline conditions, has been observed between 9,10-phenanthrenequinone and the polyether obtained on reacting o-phenylphenol with 2.28 moles of ethylene oxide.

It has further been found that the above described dark reaction is absent under acidic conditions. Thus, to obtain optimum deactivatable photosensitive compositions, the order of ingredient addition should avoid having both quinone and polyether present before an acid is added. The preferred order of addition is as follows: (a) solvent, (b) plasticizer, (c) binder, (d) leuco aminotriarylmethane, (e) hexaarylbiimidazole, (f) acid, (g) quinone photodeactivator and (h) reductant. Respective examples of the above are (a) acetone-isopropanol, (b) o-phenylphenol condensed with 2.25 moles ethylene oxide and N-ethyl-p-toluene!-sulfonamide, (c) cellulose acetate butyrate, (d) tris(4-N,N-diethylamino-o-tolyl)methane, (e) 2,2'-bis(2-chlorophenyl)-4,4',5,5'-tetrakis(3-methoxyphenyl)biimidazole, (f) dodecylbenzenesulfonic acid, (g) 1,6- and 1,8-pyrenequinone and 9,10-phenanthrenequinone, (h) 1:1 mixture of triethanolamine triacetate and trimethyl nitrilotripropionate.

Finally, the selection of the leuco triarylmethane will depend upon the color and quality of the image desired. Two or more leuco triarylmethanes may be used in combination to obtain a particular color or shade of color or to provide a neutral gray or black coloration in the image.

5. SUBSTRATES

In use, the compositions of this invention are usually coated upon or impregnated in substrates. The substrates are materials commonly used in the graphic arts and in decorative applications and include paper ranging from tissue paper to heavy cardboard; films of plastics and polymeric materials such as regenerated cellulose, cellulose acetate, cellulose nitrate, polyester of glycol and terephthalic acid, vinyl polymers and copolymers, polyethylene, polypropylene, polyvinylacetate, polymethyl methacrylate and polyvinylchloride; textile fabrics; glass; wood; and metals. Opaque as well as transparent substrates can be used. Substrates in which the photosensitive components are dissolved or which bear the photosensitive components as a coating on the reverse side of the substrate, i.e., on the side away from the ultraviolet light source used for image formation, must be transparent not only in the visible region but transparent to a portion of the ultraviolet range useful for image formation. The substrates must also be inert to the photosensitive materials and preferably should not dissolve the active components but absorb them and retain sufficient solvent to provide a medium for rapid image formation upon irradiation.

In applying a solution to paper, films, fabrics, or to the surface of rigid substrates such as glass, wood or metals the solution can be sprayed, brushed, applied by a roller or an immersion coater, flowed over the surface, picked up by immersion or spread by other means. Complete coverage of the substrate may be attained or a pattern of the light-sensitive composition may be printed on the substrate. In impregnating paper, for instance, such concentrations of solution and pick-up by the paper are made so as to provide from about 0.01 milligram per square inch to about 5.0 milligrams per square inch of the triarylmethane and equivalent amount of the hexaarylbiimidazole. Images of greater and lesser intensity of color are provided by the application of greater and lesser amounts of the triarylmethane to the substrate. For coating roll papers and films there may be used such typical devices for continuously laying down wet films as nip fed three roll reverse roll coating heads, gravure coaters, trailing blade coaters, knife overroll, 4-roll pan fed, and Mayer bar coating heads (wherein the coating thickness is controlled by a threaded or a wire wound bar). The wet thickness is adjusted such that the dry thickness after solvent removal is in the desired range (about 0.05–1.5 mil, usually around 0.3–0.5 mil on paper, 0.8–1.1 mil on film).

When the substrate is paper, besides the typical oneside coating, photosensitive compositions of this invention can be used to prepare the desirable two-side coated paper.

A particularly useful film substrate is a new adherable polyester film manufactured by Imperial Chemical Industries known as "Melinex" X-503.

Similar useful adherable substrates are "Cronar" or "Mylar" polyester film, and "Mylar" coated with "Adcote" 1069, a polyurethane primer commercially available from the Morton Chemical Co. An effective "Adcote" 1069 coating weight range for enhancement of adhesion is in the range 0.05–0.4 pound per 3,000 square feet of film surface.

The substrates bearing a solution of the compositions of this invention can be dried simply at room temperature. They can also be dried under vacuum at room temperature, by forced air solvent evaporation, or at elevated temperatures, as by radiant heating. The upper temperature limit is important in combination with exposure time. A short exposure to heat of 90° C. may not be detectably harmful, while several hours' exposure to this heat may reduce the light sensitivity of the composition.

6. LIGHT SOURCES, IMAGE FORMATION AND DEACTIVATION

Any convenient source of ultraviolet light can be used to activate the color-forming system to induce the formation of an image, whereas convenient sources of visible light can be used to achieve deactivation. In general, light sources that supply radiation in the region between about 200 Nm. and about 420 Nm. ($W_1$) are useful in producing images with the leuco triarylmethane/hexaarylbiimidazole compositions on numerous substrates. Light sources generating radiation in the region between about 400 Nm. and about 550 Nm. ($W_2$) are useful to achieve deactivation. Among the light sources which have been employed are sunlamps, pulsed and continuous Xenon flash lamps, germicidal lamps, ultraviolet lamps providing specifically light of short wavelength (2,537 A.) and lamps providing light of longer wavelengths, narrow or broad band, centered near 360 Nm., 420 Nm., 450 Nm., or 500 Nm., such as fluorescent lamps, mercury, metal additive and arc lamps. The light exposure time will vary from a fraction of a second to several minutes, depending upon the intensity and spectral energy distribution of the light, its distance from the composition, the nature and amount of the composition available, and the intensity of color in the image desired. There may also be used coherent light beams, for example, pulsed nitrogen lasers, argon ion lasers and ionized neon lasers, whose emissions fall within or overlap the ultraviolet absorption bands of the hexaarylbiimidazole or visible absorption bands of the quinones.

Ultraviolet or visible emitting cathode ray tubes widely useful in printout systems for writing on photosensitive materials are also useful for imaging the subject compositions. These in general involve an ultraviolet- or visible-emitting phosphor internal coating as the means for converting electrical energy to light energy and a fiber optic face plate as the means for directing the radiation to the photosensitive target. For purposes of this invention, the phosphors should emit strongly below 420 Nm. so as to substantially overlap the near ultraviolet-absorption characteristic or between about 420 Nm. to about 550 Nm. to overlap the visible absorption characteristics of the novel imaging compositions. Representative phosphors include the P4B (emitting at 300–550 Nm., peaking at 410 Nm.) P16 (330–460 Nm.) peaking at 380 Nm.) and P22B (390–510 Nm., peaking at 450 Nm.) types. Other phosphors which may be used are the P11 (400–560 Nm., peaking at 460 Nm.) and $ZrP_2O_7$ types. (The Electronic Industries Association, New York, New YOrk, assigns P-numbers and provides characterizing information on the phosphors; phosphors with the same P-number have substantially identical characteristics.)

Of course, it is to be understood that sources emitting principally in the ultraviolet will be most effective for color formation. In instances where a light source emits strongly in both regions, optical filters will be required to both eliminate the visible components for effective color formation and to permit deactivation without undesired color formation.

Images can be formed by a beam of light or by exposure to light of a selected area behind a negative, a stencil, or other relatively opaque pattern. The negative can be a silver negative with cellulose acetate or polyester film. The negative can also be one in which the opacity results from aggregations of areas of different refractive index. Image formation can also be accomplished in conventional diazo printing apparatus, or in a thermography device, provided the instrument emits some of its light in the ultraviolet range. A piece of onionskin paper which bears typewriting, for example, will serve as a master pattern from which copies can be made.

The subject compositions are also activatable for the purposes of this invention by electron beams. The optimum conditions depend on the formulation and its thickness, the electron beam energy and the exposure time, and are readily determined by trial. Beams having average electron energies as low as about 10,000 electron volts and as high as about 2 million electron volts have been used successfully.

The deactivating radiation employed is visible light radiation. A notable feature of this invention is that no other deactivating conditions are necessary. Thus no special precautions need be taken to prevent concurrent imaging under ambient light conditions. Negative images stable to ambient light are obtained by imagewise exposing the composition to ultraviolet light. Positive images are obtained by first imagewise exposing the composition to visible light until the desired degree of deactivation in the exposed area is attained, followed by developing the resulting latent image by exposing the composition to ultraviolet light.

7. USEFULNESS

The novel compositions of this invention are useful in such diverse fields as optical printing and image-recording generally, dyeing of textiles and other materials, photography, thermography and pattern layout. The compositions are also useful to sense thresholds of light, heat, pressure and combinations thereof, through the color changes they undergo when activated by such stimuli. Some specific uses are:

1. Radiation dosimeters. These compositions can be used as papers to determine easily the quantity of solar radiation that falls on a particular surface. They may also be useful as low cost light-meters in photographic applications. For these uses, it is necessary to compare areas which have been exposed to previously calibrated papers or surfaces, in order to allow easy analysis of the degree of radiation.
2. Blue prints. These light-sensitive compositions can find application in diazo printout equipment, where they can be made to give readily a variety of shades, with different speeds and sensitivities. It is possible to utilize these materials with caution in ordinary room light, rather than have to handle them in the dark.
3. Printing applications. This invention is particularly useful for light-actuated colored image formation and provides a dry, non-silver photographic process capable of imaging in various colors and shades on various substrates, including fabrics, paper and similar fibrous sheet material. Apparatus useful in conducting photographic dye-printing is described in U.S. Pat. Nos. 2,214,365 and 2,655,802. Even very soft paper, as for example tissue paper, which has been treated with a composition of this invention can be readily printed by projecting the desired graphic pattern onto the treated paper and irradiating it to effect the color-forming oxidation reaction. Subsequently, the image is fixed as described heretofore. These soft tissue paper compositions cannot be readily imaged by conventional printing techniques.
4. Pattern lay-out for metal working. The photosensitive composition can be applied to a metal surface when suitably formulated as a paint or a lacquer. The metal surface can then be marked by irradiation with light of one wavelength through a suitable template and the image so produced can be made permanent by irradiation with light of a second wavelength. The image may correspond to holes which are to be drilled or other operations of metal working and manufacture. This technique is particularly valuable when the metal to be marked has an irregular shape.

In general the compositions of this invention are broadly useful for optical printing and anywhere it is desirable to capture images as in photography, pattern-making, reproducing written, printed, drawn or typed matter, and recording radiation signals as line graphics, alphanumerics or other characters. The applied radiation can be passed through stencils, negatives or transparencies including halftone and continuous tone negatives and positives in contact with or projected onto the composition; or, it can be reflected for impingement on the composition from printed or typed copy or objects that are opaque or transmit radiation poorly. Similarly, images of objects having areas differing in absorption and transmission characteristics are captured by placing the objects between the color forming radiation source and the composition, e.g., foot images can be recorded for fitting shoes. Multiple copies can be made using a single imaging exposure by stacking radiation-transparent assemblies comprising the composition coated on a transparent substrate such as ultraviolet transparent film, paper or glass.

In imaging applications, the ultimately desired dye optical density pattern can be constructed stepwise, according to one or more patterns, by exposing previously unexposed areas to suitable activating radiation and/or by reexposing previously underexposed areas (i.e., areas wherein the maximum obtainable optical density has not yet been fully developed) to one or more additional exposures. Such "add on" capability and versatility of the invention compositions is particularly useful in recording information and creating electronically generated displays and graphics. Because the recorded images have excellent resolution on paper and film, they are suitable for microimaging for data storage.

From the above description it can be seen that within the broad definition of this invention, those preferred photosensitive compositions contain one or more of the following:

a. A reductant portion of the redox couple which is 10–100 percent triethanolamine tripropionate or triethanolamine tri-acetate (with the latter more preferred) and 90–0 percent 3,3′,3′′′-nitrilotripropionic acid, trimethyl ester.

b. Aminotriarylmethanes containing at least two p-dialkylamino-substituted phenyl groups having ortho to the methane carbon atom a substituent which is alkyl, alkoxy, or halogen.

c. A hexaarylbiimidazole of the class 2,2′-bis(o-substituted phenyl)-4,4′,5,5′-tetraarylbiimidazole.

d. As the oxidant portion of the redox couple a mixture of 1,6-pyrenequinone, 1,8-pyrenequinone, and 9,10-phenanthrenequinone.

e. Binders, with cellulose acetate butyrate the preferred binder.

f. Plasticizers, with alkyl arenesulfonamides preferably present and a mixture of N-ethyl-p-toluene sulfonamide and o-phenylphenol condensed with ethylene oxide, a particularly preferred mixture.

Photosensitive compositions of this invention, especially those embodying the above preferred components singly or in combination, demonstrate a variety of improved properties. For example, they are more stable in storage with less tendency towards crystallization and a resultant hazy coating. They retain maximum deactivation characteristics of speed, background stability and stability to fluorescent light. They demonstrate improved physical properties such as adhesion to substrate, resistance to finger-printing, improved tooth, improved pencil and felt-tip pen receptivity, improved "Xeroxability" and decreased blocking. The compositions of this invention demonstrate these improved properties, and others, depending to considerable extent on the embodiment of the invention. Thus the photosensitive compositions of this invention embrace mixtures of essential ingredients alone; as well as solutions of such mixtures in inert solvents; and coated articles utilizing paper, metal, films and other substrates.

These and other embodiments of this invention are illustrated in greater detail in the following examples.

EXAMPLE 1

A coating composition is prepared from the following ingredients:

| | |
|---|---|
| Acetone | 54 ml. |
| 2-Propanol | 6 ml. |
| 2,2′-Bis(o-chlorophenyl)-4,4′,5,5′-tetrakis(m-methoxyphenyl)biimidazole | 0.4180 g. |
| Tris(4-diethylamino-o-tolyl)methane | 0.0900 g. |
| p-Toluenesulfonic acid monohydrate | 0.400 g. |
| Triethanolamine triacetate | 1.0 ml. |
| 9,10-Phenanthrenequinone | 0.054 g. |
| Cellulose acetate butyrate (Eastman EAB 171-40) | 6.0 g. |
| Polyethyleneoxide adduct of o-phenylphenol average formula $C_6H_5-C_6H_4-O(CH_2CH_2O)_{2.25}H$. | 3.0 g. |

A high holdout, calendared, bleached, sulfite paper is coated with about 3 milliliters of the above composition per 1,000 square centimeters and dried in the air. Through a Corning 7–54 filter, which transmits light having a wavelength between 250 Nm. and 390 Nm., and an opaque stencil, a portion of the treated paper is irradiated with one flash from a low pressure Xenon flash tube (Hico Lite Electronic Flash, Model K) having an input of 200 watt-seconds and a light output of 5,000 candle power seconds distributed between the wavelengths of 350 Nm. and 650 Nm.. With the stencil and 7–54 filter removed, the paper is then irradiated through a Corning 0-51 filter which transmits light of wavelengths above 390 Nm. A clear, sharp image appears against a stable white background. Subjection of the paper bearing the image to repeated radiation through the 7–54 filter has no apparent effect on the quality of the image or color of the background. Thus, in about 10 milliseconds, the time of a single flash of the flash tube, substantial deactivation of the light-sensitive composition of this invention is effected with light above 390 Nm.

When a portion of the above treated paper which has been printed through the stencil and the 7–54 filter is left exposed to ambient fluorescent light in the room for about eight hours, a complete deactivation of the background against coloration by further exposure to ultraviolet light is effected.

Another portion of the paper treated with the above light-sensitive composition is first irradiated through the 0-51 filter and stencil with a single flash of the light and then irradiated only through the 7–54 filter. In this instance a stable negative image is produced; that is, the stencil letters appears colorless against a deeply colored blue background.

Sensitometric data for the above formulation is shown in Table I, as well as data obtained on substituting equal molar amounts of trimethyl nitrilotripropionate (TMNTP) of the prior art for triethanolamine triacetate (TEATA) of this invention.

TABLE I
Sensitometric behavior—TMNTP versus TEATA

| Age | $S_{0.7}$ | $OD_{max.}$ | $S_{0.1}$ |
|---|---|---|---|
| | | TMNTP | |
| Initial | 125.9±9.0 | 1.21+.05 | 17.3±7.0 |
| 1 week | 132.0±4.4 | 1.16±.08 | 13.2±1.3 |
| 2 weeks | 141.0±8.6 | 1.27±.03 | 13.3±1.3 |
| 4 weeks | 128.1±16.8 | 1.19±.10 | 10.0±1.0 |
| 8 weeks | 126.9±2.9 | 1.19±.02 | 15.5±1.3 |
| 16 weeks | 122.5±5.4 | 1.20±.01 | 13.1±0.03 |
| | | TEATA | |
| Initial | 161.2±11.2 | 1.28±.04 | 10.5±1.8 |
| 1 week | 166.7±15.9 | 1.26±.06 | 7.9±0.8 |
| 2 weeks | 166.7±14.7 | 1.39±.01 | 7.1±0.4 |
| 4 weeks | 166.5±21.5 | 1.30±.12 | 6.8±0.7 |
| 8 weeks | 183.4±3.8 | 1.36±.03 | 9.8±.09 |
| 16 weeks | 183.8+4.0 | 1.34±.00 | 7.9±.06 |

The data show that TEATA formulations have faster imaging speeds than the TMNTP formulations. Moreover, no crystals are observed in formulations containing TEATA; some crystallization is observed in formulations containing TMNTP.

In formulating coating solutions of photosensitive compositions like Example 1 above, the components B and F below are added before component G to prevent a "dark reaction" of components B and G. Preferably all the components are added in the listed alphabetical order.

A. Carrier solvent (acetone & 2-propanol)
B. Polyether plasticizer (polyethylene oxide adduct of phenylphenol)

C. Binder (cellulose acetate butyrate)
D. Leuco triarylmethane
E. Hexaarylbiimidazole
F. Acid for cationic dye stability (p-toluenesulfonic acid in 2-propanol)
G. Photodeactivator (9.10-phenanthrenequinone)
H. Reductant for the photodeactivator (triethanol-amine triacetate).

Formulations comparable to Example 1 but containing as reductants the following compounds: $N(CH_2CH_2OH)_3$, $N(CH_2CH_2OCH_2CH_3)_3$, $C_6H_5N(CH_2CH_2OH)_2$, and $C_6H_5N(CH_2CH_2OCOCH_3)_2$, are markedly inferior in imaging (color formation) to the formulation of Example 1.

Substantially identical results to those obtained in Example 1 are obtained when triethanolamine tripropionate, $N(CH_2CH_2OCOCH_2CH_3)_3$ is substituted on an equal molar basis for the triethanolamine triacetate.

EXAMPLE 2

A coating composition is prepared from the following ingredients:

| | |
|---|---|
| Acetone, commercial | 270 ml |
| Isopropanol, reagent grade | 30 ml |
| Cellulose acetate butyrate (Eastman EAB 272-20) | 30 g |
| Polyethyleneoxide adduct of o phenylphenol $[C_8H_{nl}—C_6H_9—O(CH_2CH_2O)_{2.25}H]$ | 7.5 g |
| Tris(4-diethylamino-o-tolyl)methane | 0.4500 g |
| N-ethyl-p-toluenesulfonamide | 7.5 g |
| 2,2'-Bis(o-chlorophenyl)-4,4',5,5'-tetrakis(m-methoxyphenyl)biimidazole | 1.881 g |
| p-Toluenesulfonic acid | 2.00 g |
| Pyrenequinone (a mixture of 1,6- and 1,8- isomers) | 0.0170 g |
| 9,10-Phenanthrenequinone | 0.2700 g |
| Triethanolamine triacetate | 5.125 ml |

As in Example 1, the above formulation can be coated on a suitable substrate to yield a composition which can be photoimaged and photo-fixed as exemplified in Example 1. This formulation is similar to the Example 1 formulation in performance showing a substantial increase in imaging speed (40 percent) relative to the prior art TMNTP formulation at Table I, without serious loss in background stability, and only a 5 percent loss in initial deactivation speed. Moreover, use of TEATA, instead of TMNTP, leads to improved coating appearance on storage because of less crystallization. Crystallization on storage is a deleterious property for photosensitive coatings, giving rise to blemishes, poor reproducibility, and images with poorer contrast. Additionally, the amount of hexaarylbiimidazole, an expensive ingredient, can be slightly decreased (about 10 percent), while still obtaining imaging with comparable optical density.

EXAMPLES 3-9

A series of tests are carried out comparing the effect of reductant components, and substituting dodecylbenzene-sulfonic acid (DSA) for p-toluenesulfonic acid (PTSA), in formulations similar to that of Example 2.

The results are shown in Tables II and III where it can be seen that the presence of 10 percent by volume of TEATA in the reductant component improves imaging characteristics (max O.D. and $ST_{0.7}$) without excessive loss of deactivation speed ($ST_o$) or storage stability, while the presence of at least 25 percent by volume produces substantial improvement in imaging characteristics.

TABLE II

| Example Number | TMNTP. ml. | TEATA. ml. | PTSA. g. | DSA.[1] g. | Initial Max. OD | $ST_{0.7}$ | $ST_0$ | Fluor. stab. |
|---|---|---|---|---|---|---|---|---|
| Control | 5.5 | | 2.20 | | .69 | 0 | 13.5 | .09 |
| 3 | 5.0 | 0.5 | 2.20 | | .78 | 1 | 13 | .09 |
| 4 | 4.0 | 1.5 | 2.20 | | .87 | 4.5 | 12 | .10 |
| 5 | 3.0 | 2.5 | 2.20 | | .97 | 8 | 10 | .11 |
| 6 | | 5.5 | 2.20 | | .99 | 10 | 8 | .12 |
| Control | 5.5 | | 2.20 | | .89 | 6 | 10.5 | .10 |
| Do | 5.5 | | | 3.60 | .84 | 5 | 12.5 | .09 |
| 7 | 4.0 | 1.5 | | 3.60 | 1.05 | 9.5 | 10 | .09 |
| 8 | 3.5 | 2.0 | | 3.60 | 1.03 | 9 | 10 | .08 |
| 9 | 3.0 | 2.5 | | 3.60 | 1.10 | 11 | 9 | .09 |

[1] 3.60 g. DSA=same number of equivalents as 2.20 g. PTSA.

TABLE III

| Example Number | After 6 weeks Max. OD | $ST_{0.7}$ | $ST_0$ | Fluor. stab. |
|---|---|---|---|---|
| Control | .83 | 5 | 14 | .10 |
| 3 | .84 | 6 | 12 | .10 |
| 4 | .91 | 9.5 | 11 | .10 |
| 5 | 1.0 | 12 | 10 | .10 |
| 6 | 1.10 | 13 | 7.5 | .11 |
| Control | .96 | 10 | 11 | .11 |
| Do | .90 | 8 | 12.5 | .11 |
| 7 | 1.04 | 12 | 10 | .09 |
| 8 | 1.08 | 12 | 10 | .09 |
| 9 | 1.14 | 14 | 9 | .10 |

The sensitometric data given in Tables I, II and III are obtained, and are defined, as follows:

Color formation speeds are measured using a contact printer with Sylvania Blacklight blue fluorescent lamps. Irradiance is 2.75 milliwatts per square centimeter as measured with a YSI Radiometer, Model 65, with probe, Model 6,551 in its protective plastic container, against the glass surface of the printer. (The indicated reading, 2.75 mw./cm.$^2$, is estimated to be about 60% of that actually existing at the surface of the glass.) Samples are exposed for 30 seconds through a $\sqrt{2}$ or a $\sqrt[5]{2}$ stepwedge. The $\sqrt{2}$ stepwedge is vacuum deposited Inconel-X on quartz made by Mufoletto Optical Co. The $\sqrt[5]{2}$ stepwedge is a special made by Eastman Kodak, similar to their No. 3 film stepwedge, but with $\sqrt[5]{2}$ steps instead of $\sqrt{2}$.

Deactivation speeds are measured using a printer as above with Sylvania fluorescent lamps containing a special phosphor, PER-105. Irradiance is 5.0 milliwatts per square centimeter measured with the YSI as above. The same stepwedges are used as for color formation. Deactivation exposures of 60 seconds through stepwedges are followed by color formation exposures of 30 seconds without stepwedge to determine how much deactivation has occurred.

Max. OD is the visual diffuse optical density obtained on sample by color formation exposure through step No. 1 (clear area) of the stepwedge.

$ST_{0.7}$ ($\sqrt[5]{2}$) is the stepwedge step number through which color formation sample density is 0.7 OD above unexposed background.

$ST_0$ ($\sqrt[5]{2}$) is the deactivation stepwedge step number through which final color formation is only 0.03 OD above completely deactivated background.

$S_{0.7}$ ($\sqrt{2}$) is color formation speed determined from the expression, $S_{.7} = 1,000/E_{.7}$, where $E_{.7}$ is the exposure resulting in 0.7 OD above unexposed background. $E_{.7}$ is determined from a 6th degree polynomial curve fit through the data points. Each data point consists of the calculated exposure through a particular step of the stepwedge and the resulting sample OD. Exposure for each step is calculated on the basis of a perfect $\sqrt{2}$ stepwedge with first step transmission of 0.95. Thus the exposure for step i is $E_i = .95(30 \text{ sec.}) (2.75 \text{ mw./cm.}^2) / \left(2^{\frac{i-1}{2}}\right)$.

$S_{0.1}$ ($\sqrt{2}$) is deactivation speed determined from the expression $S_{.1} = 1000/E_{.1}$, where $E_{.1}$ is the deactivation exposure resulting in final color formation 0.1 above completely deactivated background. $E_{.1}$ is determined from a 7th degree polynomial curve fit in a manner similar to that used for color formation. In this case $E_i = .95(60 \text{ sec.}) (5.0 \text{ mw./cm.}^2) / \left(2^{\frac{i-1}{2}}\right)$

FLUORESCENT STABILITY

A sample is exposed for four hours under a General Electric F15/T8 (cool-white) fluorescent light at 150 ± 7 foot candles as determined by a G.E. Type 213 Light Meter. The optical density as determined on a MacBeth RD-100 Densitometer is reported.

EXAMPLE 10

Based on the preceding Examples, a coating composition is prepared from the following ingredients:

| Component | Quantity |
|---|---|
| Acetone | 54 ml |
| 2-Propanol | 6 ml |
| 2,2'-Bis(o-chlorophenyl)-4,4',5,5'-tetrakis(m-methoxyphenyl)biimidazole | 0.4180 g |
| Tris(4-diethylamino-o-tolyl)methane | 0.0900 g |
| Dodecylbenzenesulfonic acid (Richardson Co. Richonic Acid B) | 0.70 g |
| Triethanolamine triacetate | 0.4 ml |
| Trimethyl 3,3',3''-nitrilotripropionate | 0.6 ml |
| 9,10-Phenanthrenequinone | 0.0486 g |
| Cellulose acetate butyrate (Eastman EAB 272-20) | 6.0 g |
| Polyethyleneoxide adduct of o-phenylphenol [average formula $C_6H_5-C_6H_4-O(CH_2CH_2O)_{2.25}H$] | 1.14 g |
| Pyrenequinone (a 1:1 mixture of 1,6- and 1,8-isomers) | 0.003 g |
| N-ethyl-p-toluenesulfonamide (Monsanto Chemical Company's Santicizer-3) | 1.3 g |

This formulation exhibits equivalent or better imaging speed than the TMNTP formulation of Table I and has better background stability to indoor light.

The cardinal advantage of this coating formulation is its' freedom from crystallization and phase separation on storage, which enhances both its sensitometry and aesthetic appearance.

There is additionally a two-fold increase in resolution retention, decreased mottle when employed in the positive mode, than with the TMTNP formulation of Table I.

EXAMPLE 11

The formulation of Example 10 is applied to "Tyvek" spunbonded olefin, Type 1058. Sensitometric properties obtained are identical to the formulation coated on a more conventional substrate, regular HG paper obtained from P. J. Schweitzer Co. However, a 35 X increase in adhesion of the coating to the olefin substrate is found as compared to adhesion to paper. EXAMPLE 12

The following formulation, a variation of Example 10, particularly in TMNTP/TEATA ratio, displays completely normal, useful, dual response properties.

| Component | Quantity |
|---|---|
| Acetone | 390 ml |
| 2,2'-Bis(o-chlorophenyl)-4,4',5,5'-tetrakis(m-methoxyphenyl)biimidazole | 2.09 g |
| Tris(4-diethylamino-o-tolyl)methane | 0.450 g |
| Dodecylbenzenesulfonic acid | 6.8 g |
| Triethanolamine triacetate | 10.0 ml |
| Trimethyl 3,3',3''-nitrilotripropionate | 2.0 ml |
| 9,10-Phenanthrenequinone | 0.243 g |
| Cellulose acetate butyrate (Eastman EAB 272-20) | 30 g |
| Pyrenequinone (1:1 mixture of 1,6- and 1,8-isomers) | 0.015 g |
| N-ethyl-p-toluenesulfonamide | 6.0 g |

It is to be noted in this example, TEATA-DSA salt acts as a replacement for the o-phenylphenol-ethylene oxide condensate plasticizer.

No crystallization is observed in the formulation after storage for several months.

EXAMPLE 13

A composition is prepared identical to that of Example 10 except that 0.10 g. of Silicone L-5410 is added for antiblock properties. Silicone L-5410 is described by Union Carbide, the manufacturer, as a silicone surfactant for use in urethane foam systems.

EXAMPLE 14

A composition is prepared identical to that of Example 10 except that 0.40 g. of "Syloid" 63 and 0.05 g. of a fluorocarbon ester of the formula $F(CF_2CF_2)_nCH_2CH_2O\text{-}CO\text{-}(CH_2)_{16}CH_3$, where $n = 3$ and 4, are added. The "Syloid" is added for antiblock, anti-image transfer and to confer "writability". The "Syloids" are described as synthetic, micron-sized, amorphous silica gels, manufactured by the Davison Chemical Division of W. R. Grace and Company. The fluorocarbon ester is added to reduce blocking tendencies of coated papers and films.

EXAMPLE 15

Another useful photosensitive formulation consists of the composition of Example 10 containing 0.80 g. 325 mesh mica, (for example, white waterground mica supplied by the English Mica Co., Stanford, Conn.). The addition of mica decreases image transfer and blocking tendencies. Storage data after 3 months show no crystallization in this composition and the sensitometry is not affected by addition of the mica.

EXAMPLE 16

The following formulation is coated on "Melinex" polyester film substrate to give a coating 0.7 to 0.8 mil. thick after evaporation of solvent:

| Component | Quantity |
|---|---|
| Acetone | 60 ml |
| Cellulose acetate butyrate (Eastman EAB 272-3) | 10 g |
| Ethyleneoxide adduct of p-cresol containing 1.5 moles of ethyleneoxide per mole of cresol | 3.5 g |
| 2,2'-Bis(o-chlorophenyl)-4,4',5,5'-tetrakis (m-methoxyphenyl)biimidazole | 1.248 g |
| TEATA | 1.0 ml |
| p-Toluenesulfonic acid·H₂0 | 0.267 g |
| Tris(p-diethylamino-o-tolyl)methane | 0.180 g |
| Phenanthrenequinone | 0.162 g |

The product is a blue, dual response, unpeelable film with maximum contrast of about 1.0 O.D. useful in duplication of silver and other master films. The film retains 30–60 line pairs/mm. ambient resolution after 5 months and is unpeelable from the Melinex polyester film substrate.

No crystals are observed in such films containing TEATA even after 6 months; comparable films containing TMNTP show crystallization after 1 month.

EXAMPLE 17

The following formulation for film is similar to that of Example 16, above except that it contains a different leuco aminotriaryl methane, is applied from a different solvent, and is coated on "Mylar" polyester film base which has been primed with 0.05 pounds of "Adcote" 1069 polyurethane per 3,000 square feet of film to give unpeelable adhesion.

| Component | Quantity |
|---|---|
| Solvent | |
| butyl acetate | 20%) |

| | |
|---|---|
| ethyl acetate 10%) | |
| isopropanol 20%) | 60 ml |
| n-butanol 10%) | |
| toluene 40%) | |
| p-Toluenesulfonic acid ·H₂O | 0.50 g |
| Bis(p-diethylamino-o-tolyl)(3,4-dimethoxyphenyl)methane | 0.342 g |
| Cellulose acetate butyrate (Eastman EAB 272-3) | 10 g |

The product is a purple, dual response, unpeelable film particularly useful for silver and other master film duplication. This material is "Xeroxable," while the film of Example 16 is poor in "Xeroxability."

EXAMPLE 18

The formulation of Example 16 is also applied to anodized aluminum and painted aluminum. This coating adheres quite well to these metal substrates and is thus, useful for lofting.

EXAMPLE 19

A composition is prepared similar to that of Example 17 namely:

| Component | | Quantity |
|---|---|---|
| Solvent | | |
| butyl acetate | 20%) | |
| ethyl acetate | 10%) | |
| isopropanol | 20%) | 2,700 ml |
| n-butanol | 10%) | |
| toluene | 40%) | |
| Cellulose acetate butyrate (Eastman EAB 272-3) | | 150 g |
| p-Cresol 1.5 ethyleneoxide adduct | | 52.5 g |
| 2,2'-Bis(o-chlorophenyl)-4,4',5,5'-tetrakis(m-methoxyphenyl)biimidazole | | 18.72 g |
| TEATA | | 15 ml |
| p-Toluenesulfonic acid ·H₂O | | 4.005 g |
| Tris (p-diethylamino-o-tolyl)methane | | 2.700 g |
| Phenanthrenequinone | | 2.43 g |
| Rosaniline | | 0.1500 g |

Rosaniline is added to make it easier to see the coating on the metal; it also has the added benefit of increasing apparent contrast of the image.

This formulation adheres firmly to anodized aluminum. The formulation exhibits improved adhesion to steel, shiny aluminum, and other such surfaces when the surface has been previously primed with normal priming weights. "Preparakote," a Du Pont primer-surfacer, is an effective primer useful with the above photosensitive formulation.

EXAMPLE 20

Samples of aluminized "Mylar" polyester film, when coated with the formulation of Example 19 gives images with excellent contrast. With a primed surface, for improved adhesion, very attractive labels can be prepared.

EXAMPLE 21

Paper coated on both sides with photoimageable formulations is very desirable. When formulations, as Example 10, are applied by a conventional coating technique effective to yield single-side coated product, in an attempt to obtain two-side coated papers, the results are unsatisfactory. The products are satisfactorily coated on one side, but contain "blisters" on the second side; this "blister" effect renders the product unacceptable.

A means for preparing blister-free, two-side coated papers of the thickness desired, and at practicable coating concentrations and drying rates, has been found. The solution depends upon coating weight (i.e., coating thickness) applied, and the ability of the paper to resist solvent penetration. Resistance to solvent penetration, termed holdout, can be measured. The relationship of coating weight above which blisters form, and solvent holdout (as reported by the supplier) on a series of commercial papers supplied by the P. J. Schweitzer, Div. of Kimberly-Clark Corp., is shown in the following table. The coating formulation is that of Example 10:

TABLE IV

| Paper 32 lb./ 2,000 ft.² | Holdout value | | Coating Wt., lbs./ 3,000 ft.² | |
|---|---|---|---|---|
| | 1st side | 2nd side | 1st side | 2nd side |
| XHP-a | 200 | 300 | 9.6 | 8.2 |
| XXH | 185 | 230 | 9.6 | 8.1 |
| XHP-b | 100 | 100 | 9.6 | 5.7 |
| XH | 80 | 80 | 9.9 | 4.1 |

It is desirable, with the formulations described herein, to apply the coatings to both sides in the range of 7–10 pounds per 3,000 square feet. At this weight (thickness), as is obvious from Tables IV, and V some commercial paper would yield blistered product. The common commercial papers which exhibit this defect include 25 pounds per, 32 pounds per, and 45 pounds per 2,000 square feet of regular HG papers of P. J. Schweitzer Division, Kimberly-Clark Corp., and their 32 pounds per 2,000 square feet grades HG—XH and HF—XL.

Certain papers, however, can be coated on both sides at 7–10 pounds per 3,000 square feet to yield marketable "Blister"-free, double-side coated papers with the Example 10 compositions described above. These operable papers are high holdout papers, which are resistant to solvent penetration through the paper. Table V gives the results that are obtained on coating with the formulation of Example 10 on both sides of the paper, applied single side per pass, at a coating weight of 10 pounds per 3,000 square feet. Blisters are seen on second pass where indicated.

TABLE V

| Paper | Holdout 1st Side/2nd Side | | Comment |
|---|---|---|---|
| 32 lb. XHP-a | 200/ | 300 | Blisterfree |
| 32 lb. XXH | 185/ | 230 | Blisterfree |
| 32 lb. HG-XH | 62/ | 35 | Blistered |
| 32 lb. HG-XL | 30/ | 26 | Blistered |
| 32 lb. HG | <10/ | <10 | Blistered |
| 42 lb. HG | <10/ | <10 | Blistered |
| 25 lb. HG | <10/ | <10 | Blistered |

In addition, the Kimberly-Clark Corporation provide a series of high holdout papers among which are KC-9582, KC-9585 and KC-9515 which have sufficient solvent holdout to allow two-side coatability via the "single pass" technique.

From the above it is concluded that papers having hold-out values greater than 150/200 are applicable to "blister"-free double-side coating, applied one pass per side, with the photosensitive composition described herein at weights of 7–10 pounds per 3,000 square feet.

EXAMPLE 22

Particularly desirable for the general photoproofing market are dual response photosensitive compositions, as described herein, applied to glossy paper substrates. Thus, formulations as described in Examples 10 and 14, are applied to a commercial paper identified as 221–D, a high quality photographic paper produced by Schueller Technical Papers Incorporated. This paper has a barium sulfate-gelatin coating that gives a smooth glossy surface. These products appear commercially useful, particularly the coatings of Example 14, wherein no "pick-off" is observed. Furthermore, as with the other photosensitive formulations described herein, the storage stability of these papers is excellent.

EXAMPLE 23

Improved physical stability, on the glossy substrate described above in Example 22 is also found with dual response formulations yielding a neutral (Black) image on a nearly white background. These formulations are as follows:

| | |
|---|---|
| Acetone | 162 ml |
| 2-Propanol | 80 ml |
| 2,2'-Bis(o-chlorophenyl)-4,4',5,5'-tetrakis(m-methoxyphenyl)biimidazole | 2.3391 g |
| p-Toluenesulfonic acid monohydrate | 1.0272 g |
| Triethanolamine triacetate | 3 ml |
| 9,10-Phenanthrenequinone | 0.3744 g |
| Cellulose acetate butyrate (Eastman EAB 171-40) | 18 g |
| Polyethyleneoxide adduct of o-phenylphenol (having the average formula $C_6H_5-C_6H_4-O(CH_2CH_2)_{2.25}H$) | 13.5 g |
| Bis(p-diethylamino-o-tolyl)3,4-dimethoxyphenyl methane | 0.57 g |
| Bis(p-diethylamino-o-tolyl)phenyl methane | 0.621 g | and the same composition but also including 2.55 g. of "Syloid" 63 amorphous silica.

EXAMPLE 24

The following formulation is a simplified form of Example 10 for applications where a reduced cost paper is desired. It has slower image and fix speeds and a lower maximum OD than the formulation of Example 10, but material costs are lower.

The coating composition is prepared from the following ingredients:

| | Amount | Wt. % |
|---|---|---|
| Acetone | 300 ml. | – |
| 2,2'-Bis(o-chlorophenyl)-4,4',5,5'-tetraphenylbiimidazole | 3.87 g. | 6.7 |
| Tris(4-diethylamino-o-tolyl)methane | 0.675 g. | 1.2 |
| Dodecylbenzenesulfonic acid (Richardson Co. Richonic Acid B) | 3.5 g. | 6.0 |
| Triethanolamine triacetate | 6.7 ml. | 12.7 |
| 9,10-Phenanthrenequinone | 0.36 g. | 0.6 |
| Cellulose acetate butyrate (EAB-272-20) | 30 g. | 51.8 |
| Polyethyleneoxide adduct of o-phenylphenol [average formula $C_6H_5-C_6H_4-O(CH_2CH_2)-_{2.25}H$] | 5.7 g. | 9.8 |
| N-ethyl-p-toluenesulfonamide (Monsanto Chemical Company's "Santicizer"-3 | 6.5 g. | 11.2 |

The formulation is coated at 3 pounds per 3,000 square feet on Schweitzer Regular HG paper. Further cost reductions can be realized by even lower weights on substrates such as diazo paper or newsprint.

The data below are obtained by imaging with Sylvania Blacklite Blue fluorescent lamps for 30 seconds at an intensity of 2 milliwatts per square centimeter. Deactivation irradiation (60 seconds, 5 milliwatts per square centimeter) is effected using the PER-105 lamps as described in Example 9.

Sensitometry Versus Coating Weight

| Coating Wt. lbs./3,000 ft.² | $OD_{max}$ | OD Deact. |
|---|---|---|
| 8–10 | 0.9–1.0 | 0.10–0.15 |
| 5 | 0.8–0.9 | 0.10–0.15 |
| 3 | 0.7–0.8 | 0.10–0.15 |

Imaging and fixing speeds are significantly slower; $OD_{max}$ about 20 percent lower; and background OD to room light slightly higher than obtained with the Example 10 formulation.

The resolution retention of this formulation is found to be 25 line pairs per millimeter initially; 5 line pairs per millimeter after 1 month ambient; and 3 line pairs per millimeter after 1 month ambient; and 3 line pairs per millimeter after 1 month wet storage.

This low-coast, dual response paper is useful as a pattern paper or maker in the garment industry.

EXAMPLE 25

The following formulation differs from Example 17 in that it it coated from a different solvent and contains different proportions of ingredients.

It yields a neutral, negative working, viewer stable film, principally designed for duplication of silver film and other master film.

The formulation is coated on "Melinex" polyester X503 film and on 7-mil "Mylar" polyester film primed as in Example 17 to give a coating 0.7 to 0.8 mil thick after evaporation of solvent; the coating weights are approximately 15.5 pounds per 3,000 square feet.

| Component | Quantity |
|---|---|
| Methylene chloride | 60 ml. |
| Cellulose acetate butyrate | 10 g. |
| Ethylene oxide adduct of p-Cresol containing 1.5 moles of ethyleneoxide per mole of cresol | |

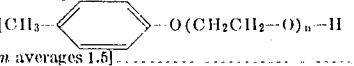

| | |
|---|---|
| where $n$ averages 1.5] | 2.5 g. |
| 2,2'-bis(o-chlorophenyl)-4,4',5,5'-tetrakis(m-methoxyphenyl)biimidazole | 1.94 g. |
| Triethanolamine triacetate | 1.0 g. |
| p-Toluenesulfonic acid·H₂O | 1.05 g. |
| Phenanthrenequinone | 0.176 g. |
| Tris(p-diethylamino-o-tolyl)methane | 0.2 g. |
| Bis(p-diethylamino-o-tolyl)-(3,4-dimethoxyphenyl)methane | 1.2 g. |

These products are blue-purple, reversable, unpeelable films particularly useful for silver and other master film duplication. These films retain resolution longer than the films of Examples 16 and 17.

EXAMPLE 26

The following formulation is coated on "Adcote"-primed 700D "Mylar" polyester film to give a coating thickness of 0.7 to 0.8 mil after evaporation of solvent.

| Component | Quantity | % by wt. of dry formulation |
|---|---|---|
| Acetone | 54 ml. | – |
| Isopropanol | 6 ml. | – |
| Cellulose acetate butyrate | 10 g. | 60.4 |
| Ethyleneoxide adduct of p-cresol containing 1.5 moles of ethyleneoxide per mole of cresol | 3.2 g. | 19.3 |
| 2,2'-Bis(o-chlorophenyl)-4,4',5,5'-tetrakis(m-methoxyphenyl)biimidozde | 1.39 g. | 8.4 |
| Triethanolamine triacetate | 1.0 ml. | 6.0 |
| p-Toluenesulfonic acid·H₂0 | 0.331 g. | 2.0 |
| Tris(p-diethylamino-o-tolyl)methane | 0.359 g. | 2.17 |
| Phenanthrenequinone | 0.162 g. | 0.98 |
| Diethyl orange [3,6-bis(diethylamino)-acridine hydrochloride] | 0.125 g. | 0.76 |

The product is a purple, dual response, unpealable film with orange background intended for x-ray duplication. It has a maximum density of 1.8 and a total contrast of 1.5 Gamma over 70 percent or more of the tonal scale range is 1.0–1.1. The film retains 15–30 line pairs per millimeter under ambient storage conditions for one month or more.

EXAMPLE 27

A formulation is prepared, identical in all respects with example 26 except for the addition of 1.4 g. of "Syloid" 63.

This product has an aesthetically pleasing mat finish and improved surface properties including complete elimination of tack, block, and ferrotyping.

EXAMPLE 28

This formulation is similar to that of Example 10, but is intended for applications in which aesthetics are not critical, such as in pattern making, toys, and novelties.

For some applications it is suitable to use a paper which is simply impregnated with photosensitive solution. The polymeric binder, such as cellulose acetate butyrate, can be eliminated giving rise to certain economic advantages, in particular reduced actives' cost and reducing coating cost. Simple spray or "kiss" coating techniques give a paper which is imageable on both sides. The principal problem encountered with impregnated, binderless coatings is storage stability, particularly with regard to crystallization and formation of such latent defects as fingerprints.

The following preferred composition provides an $OD_{max} = 0.5 \pm 1$ on exposure to a blacklite blue source, when coated at $4.0 \pm 0.5$ pounds per 3,000 square feet of standard diazo base paper. Room light deactivates this paper to a white background. No fingerprints or other latent defects are observed during storage at 60° C. for 1 week.

| Component | Amount |
|---|---|
| Acetone | 1,080 ml. |
| 2-Propanol | 120 ml. |
| 2,2'-Bis(o-chlorophenyl)-4,4',5,5'-tetrakis(m-methoxy-phenyl)biimidazole | 8.36 g. |
| Tris(4-diethylamino-o-tolyl)methane | 0.90 g. |
| Dodecylbenzenesulfonic acid (Richardons Co. Richonic Acid B) | 13.68 g. |
| Triethanolamine triacetate | 23.60 g. |
| 9,10-Phenanthrenequinone | 1.08 g. |
| Polyethyleneoxide adduct of o-phenylphenol [average formula $C_6H_5$—$C_6H_4$—$O(CH_2CH_2O)_{2.25}H$] | 60.0 g. |
| N-ethyl-p-toluenesulfonamide (Monsanto Chemical Company's Santicizer-3) | 30.0 g. |
| Bis-(4-diethylamino-o-tolyl)(3,4-dimethoxyphenyl) methane | 0.90 g. |

The base paper is a standard diazograde paper, designated as Facsimile Direct Process Base Paper-Plain by Andrews Paper & Chemical Co., 15.2 pounds per 1,000 square feet and 4 mil thick.

The papers are "Kiss" coated. Best results are obtained when the wrap angle on the kiss roll is adjusted to bring the substrate approximately tangent to the kiss roll. The kiss roll to web speed ratio should be between 1:1 and 2:1. Coating weights are controlled by varying the web and roll speeds.

EXAMPLE 29

In spray (aerosol) form, the compositions of this invention offer a new concept to the graphic arts and design industries. Now, virtually any type of material including metal, wood, cloth, paper, plastic, glass and leather can be used as a proof. Relief areas and irregular surfaces become photosensitized by simply spraying with a composition as illustrated below. Positive or negative images can be reproduced almost instantly on these surfaces. The proof develops without processing and is self-fixing without liquids in ordinary room light.

The variety of applications is almost limitless. Existing proofs can be resensitized and additional proof copy added. Mock-ups of three dimensional objects such as cans, boxes, and displays, can be proofed. Proofs can be "pulled" on the same paper, foil, or fabric that is to be used in final production. In some small-quantity applications, the "proof" may even be the end product.

A preferred dual response, photosensitive aerosol (spray) composition contains the following components:

| Component | Amount |
|---|---|
| Acetone | 59.92 g. |
| 2,2'-Bis(o-chlorophenyl)-4,4',5,5'-tetrakis(m-methoxyphenyl)biimidazole | 0.258 g. |
| Tris(4-diethylamino-o-tolyl)methane | 0.054 g. |
| Dodecylbenzenesulfonic acid (Richardons Co. Richonic Acid B) | 0.423 g. |
| Triethanolamine triacetate | 0.272 g. |
| Trimethyl 3,3',3''-nitrilotripropionate | 0.407 g. |
| 9,10-Phenanthrenequinone | 0.030 g. |
| Cellulose acetate butyrate | 3.7 g. |
| Polyethyleneoxide adduct of o-phenylphenol [average formula $C_6H_5$—$C_6H_4$—$O(CH_2CH_2O)_{2.25}H$] | 0.705 g. |
| Pyrenequinone (a 1:1 mixture of 1,6- and 1,8-isomers | 0.0018 g. |
| N-ethyl-p-toluenesulfonamide (Monsanto Chemical Company's Santicizer-3) | 0.803 g. |
| Methylene chloride | 27.0 g. |
| 2B Alcohol | 5.4 g. |
| Dichlorodifluoromethane | 81 g. |

The above composition is conveniently applied from a conventional aerosol dispensing cannister. The spray is a photosensitive solution which forms a blue image after exposure to ultraviolet light for 15 to 20 seconds.

In subdued room light, the desired surface can simply be sprayed with the above formulation. The surface must be dry and free of grease. The spray is applied evenly from side to side, applying two or three light coats (glass and other gloss surfaces required additional coverage). Each coat is allowed to dry for 30 seconds.

A transparent master copy, film negative or stencil is placed over the treated area and both are brought into tight contact. Exposure is made through the master with blacklite blue fluorescent ultraviolet light for 15 seconds or longer. This finishes the printing operation. No other developing is necessary as the spray will self-fix under normal room light in about one hour. If more rapid fixing is desired, the sensitized area can be exposed to an intense visible light source such as pulsed Xenon for one or two minutes.

Because the color in the blue image areas can be controlled by the length of exposure to ultraviolet light, multiple "burns" are possible. With the above formulation, each "burn" is visible immediately after exposure. Two or more color separations can thereby be exposed on the same surface. Even continuous tone proofing is possible.

EXAMPLE 30

A particularly preferred composition, especially useful for both single and two-side coated papers, is the following:

| Component | Amount | % of Non-Volatiles |
|---|---|---|
| Acetone | 300 ml. | |
| 2,2'-Bis(o-chlorophenyl)-4,4',5,5'-tetrakis(m-methoxyphenyl)biimidazole | 2.30 g. | 4.24 |
| Tris(4-diethylamino-o-tolyl)methane | 0.450 g. | 0.83 |
| Dodecylbenzenesulfonic acid (Richardson Co. Richonic Acid B) | 2.9 g. | 5.34 |
| Triethanolamine triacetate | 2.46 g. | 4.53 |
| Trimethyl 3,3',3''-nitrilotripropionate | 3.7 g. | 6.82 |
| 9,10-Phenanthrenequinone | 0.243 g. | 0.45 |
| Cellulose acetate butyrate (EAB-531-1) | 6.0 g. | 11.1 |
| Cellulose acetate butyrate (EAB-171-40) | 24.0 g. | 44.2 |
| Polyethyleneoxide adduct of o-phenyl-phenol [average formula $C_6H_5$—$C_6H_4$—$O(CH_2CH_2O)_{2.25}H$] | 6.5 g. | 12.0 |
| Pyrenequinone (a 1:1 mixture of 1,6- and 1,8- isomers) | 0.015 g. | 0.03 |
| N-ethyl-p-toluenesulfonamide (Monsanto Chemical Company's Santicizer-3) | 5.7 g. | 10.5 |

EXAMPLE 31

Precoating (subcoating) paper substrates is another useful embodiment for practicing this invention. Subcoats can yield improved adhesion of the photosensitive formulation to the paper substrate, and improved resolution retention. To illustrate, Regular HG paper (P. J. Schweitzer Div. of Kimberly Clark) is coated on one side with an acetone solution of polyvinyl acetate (Airco Corp., "Vinac" B100) in a weight range of 0.9 to 6 pounds per 3,000 square feet with a standard coating procedure using a threaded bar. The direct coated papers can be handled with no difficulty.

Papers coated with the polyvinyl acetate are then coated by standard coating techniques, such as a threaded bar, with an acetone solution of photosensitive lacquer as described in Example 23. A coating weight of 10 pounds per 3,000 square feet is obtained with a standard coating procedure.

A glossy coating is also obtained when coated on paper precoated with 6 pounds of polyvinylacetate per 3,000 square feet. Unpeelable adhesion of the photosensitive layer to the subcoated paper is obtained when coated on a 3 pound per 3,000 square feet sub-coating of "Vinac" B100. Lesser amounts of "Vinac" B100 give an improvement but do not give unpeelable adhesion. An increase in resolution retention is also observed with the greatest increase occurring on the paper coated with 6 pounds of "Vinac" B100 per 3,000 square feet of paper.

The above detailed description is given for clearness of understanding only and no unnecessary limitations are to be understood therefrom. The invention is not limited to the exact details shown and described, as obvious modifications will occur to those skilled in the art.

The embodiments of the invention in which an exclusive property or privilege is claimed are are defined as follows:

An improved photosensitive composition comprising an intimate admixture of a. an acid salt of an oxidizable, leuco aminotriarylmethane and a strong acid which forms a salt with an anilino amino group b. a hexaarylbiimidazole which absorbs principally in the ultraviolet region and is a photooxidant for the leuco aminotriarylmethane;

c. a redox couple containing (1) as an oxidant a polynuclear quinone absorbing principally in the 430 Nm. to 550 Nm. region, and (2) a reductant component, the improvement comprising a reductant component consisting essentially of 0 to 90 percent of a lower alkyl ester of nitrilotriacetic or nitrilotripropionic acid and from 100 to 10 percent of an acyl ester of triethanolamine of the formula $$N(CH_2CH_2O\overset{O}{\underset{\|}{C}}-R)_3$$

wherein R is alkyl of 1 to 4 carbon atoms.

2. A composition of claim 1 wherein the acyl ester of triethanol amine is triethanol amine triacetate or triethanolamine tripropionate.

3. A composition of claim 1 wherein the leuco aminotriarylmethane is one wherein at least two of the aryl groups are phenyl groups having (a) an $R_1R_2N$-substituent in the position para to the bond to the methane carbon, wherein $R_1$ and $R_2$ are each hydrogen, alkyl of 1 to 10 carbon atoms, 2-hydroxyethyl, 2-cyanoethyl, benzyl or phenyl, and (b) a group otho to the bond to the methane carbon atom which is selected from lower alkyl, lower alkoxy, fluorine, chlorine, bromine, or butadienylene which when joined to the phenyl group forms a naphthalene ring; and the third aryl group, which can be the same as or different from the first two, is, when different from the first two, thienyl, furyl, oxazyly pyridyl, thiazolyl, indolyl, indolinyl, benzooxazolyl, quinolyl, benzothiazolyl, phenyl, naphthyl, or such groups substituted with lower alkyl, lower alkoxy, methylenedioxy, fluoro, chloro, bromo, amino, lower alkylamino, lower dialkylamino, lower alkylthio, hydroxy, carboxy, carbonamido, lower carbalkoxy, lower alkylsulfonyl, lower alkylsulfonamido, arylsulfonamide of 6 to 10 carbon atoms, nitro or benzylthio;

the hexaarylbiimidazole is a 2,2',4,4'5,5'-hexaphenylbiimidazole in which the phenyl groups can contain substituents having Hammet sigma values of from -.4 to .4.

4. A composition of claim 2 wherein the reductant contains 0 to 90 percent of the methyl ester of 3,3'3,"-nitrilotripropionic acid.

5. A composition of claim 2 wherein the leuco aminotriaryl methane has the structural formula

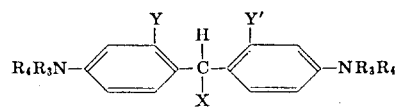

wherein $R_3$ and $R_4$ are benzyl or lower alkyl;

Y and Y' are lower alkyl, lower alkoxy or halogen; and

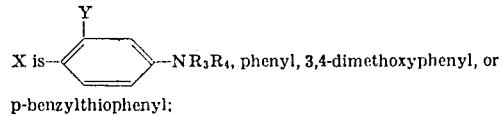

X is—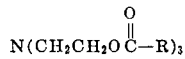—$NR_3R_4$, phenyl, 3,4-dimethoxyphenyl, or p-benzylthiophenyl;

the hexaarylbiimidazole is a 2,2'-bis(o-substituted phenyl)-4,4',-5,5'-tetraarylbiimidazole with the substituent selected from among fluorine, chlorine, bromine, methyl and methoxy; and the polynuclear quinone is a mixture of 1,6-pyrenequinone and 1,8-pyrenequinone or their mixture with 9,10-phenanthrenequinone.

6. A composition of claim 2 wherein the acyl ester of triethanolamine is triethanolamine triacetate, and it comprises 25 to 60 percent of the reductant component.

7. A composition of claim 5 wherein the reductant contains 0 to 90 percent of the trimethyl ester of 3,3',3"-nitrilotripropionic acid.

8. A composition of claim 7 wherein the acyl ester of triethanolamine is triethanolamine triacetate.

9. A composition of claim 1 wherein the leuco aminotriaryl methane is tris(4-diethylamino-2-tolyl)methane; the hexaarylbiimidazole is 2,2'-bis(o-chlorophenyl)-4,4',5,5'-tetrakis(m-methoxyphenyl)biimidazole; the polynuclear quinone is a mixture of 1,6-pyrenequinone with 1,8-pyrenequinone, and 9,10 -phenanthrenequinone; and the reductant is a mixture of triethanolamine triacetate and the trimethyl ester of 3,3',3"-nitrilotripropionic acid.

10. A composition of claim 1 wherein the leuco aminotriarylmethane is tris(4-diethylamino-o-tolyl)methane; the hexaarylbiimidazole is 2,2'-bis(o-chlorophenyl)-4,4',5,5'-tetrakis(m-methoxyphenyl)biimidazole; the polynuclear quinone is 9,10-phenanthrenequinone and the reductant is triethanolamine triacetate.

11. A composition of claim 1 wherein the leuco amino triarylmethane is bis(p-diethylamino-o-tolyl)(3,4-dimethoxy phenyl)methane; the hexaarylbiimidazole is 2,2'-bis(o-chlorophenyl)-4,4',5,5'-tetrakis(m-methoxyphenyl)biimidazole; the polynuclear quinone is 9,10-phenanthrenequinone; and the reductant is triethanolamine triacetate.

12. A composition of claim 1 in admixture with an inert organic solvent or water moisture.

13. A composition of claim 1 combined with a plasticizer and a light transparent polymeric binder.

14. A composition of claim 1 coated on a substrate.

15. A composition of claim 1 impregnated in a substrate.

16. A composition of claim 1 coated on paper.

17. A composition of claim 1 coated on a plastic film.

18. A composition of claim 1 coated on a metal.

19. A composition of claim 1 coated on both sides of paper.

20. A composition of claim 13 in the form of a self-supporting film.

* * * * *